United States Patent
Miller

(10) Patent No.: US 10,741,058 B1
(45) Date of Patent: Aug. 11, 2020

(54) VISUAL LOCKDOWN NOTIFICATION AND ALERT DEVICE, ELECTRONIC DOOR STOP REMOTE BROADCAST DEVICE, SILENT BROADCAST SIGNAL-ACTIVATED ELECTRONIC DOOR STOP, AND SOUND-ACTIVATED REMOTE RELEASE ELECTRONIC DOOR STOP

(71) Applicant: Brian Douglas Miller, Anchorage, AK (US)

(72) Inventor: Brian Douglas Miller, Anchorage, AK (US)

( * ) Notice: Subject to any disclaimer, the term of this patent is extended or adjusted under 35 U.S.C. 154(b) by 0 days.

(21) Appl. No.: 16/431,541

(22) Filed: Jun. 4, 2019

Related U.S. Application Data

(63) Continuation-in-part of application No. 16/361,495, filed on Mar. 22, 2019, which is a continuation-in-part of application No. 16/053,184, filed on Aug. 2, 2018, now Pat. No. 10,400,489.

(51) Int. Cl.
| | |
|---|---|
| G08B 27/00 | (2006.01) |
| G08B 5/38 | (2006.01) |
| E05C 17/44 | (2006.01) |
| G06F 9/54 | (2006.01) |
| G08B 25/10 | (2006.01) |

(52) U.S. Cl.
CPC .......... G08B 27/005 (2013.01); E05C 17/446 (2013.01); G06F 9/542 (2013.01); G08B 5/38 (2013.01); G08B 25/10 (2013.01)

(58) Field of Classification Search
CPC ........ G08B 27/005; G08B 5/38; G08B 25/10; G08B 25/14; G06F 9/542

USPC .......................................................... 340/540
See application file for complete search history.

(56) References Cited

U.S. PATENT DOCUMENTS

| | | | | |
|---|---|---|---|---|
| 2008/0115545 | A1* | 5/2008 | Schumm ............... | E05B 53/005 70/107 |
| 2010/0188234 | A1* | 7/2010 | Farley ...................... | G08B 5/36 340/577 |
| 2012/0279538 | A1* | 11/2012 | Chen ........................ | A45B 3/00 135/66 |
| 2013/0342342 | A1* | 12/2013 | Sabre ...................... | G09F 13/18 340/509 |
| 2014/0313034 | A1* | 10/2014 | Dodson ................ | G08B 25/006 340/541 |

(Continued)

*Primary Examiner* — Emily C Terrell
(74) *Attorney, Agent, or Firm* — Plager Schack LLP; Mark H. Plager; Stephen Hallberg

(57) ABSTRACT

Electronic door stop devices, an electronic door stop remote broadcast device, and a visual lockdown notification and alert device are disclosed. The electronic door stop devices include a sound-activated remote release electronic door stop that automatically detects a particular sound and releases a propped open door and a silent broadcast signal-activated electronic door stop that provides automatic closing of propped open doors, by both silent broadcast signal and particular sound detection. The electronic door stop remote broadcast device broadcasts a wireless data signal to multiple silent broadcast signal-activated electronic door stops to automatically and concurrently release any doors propped open by the silent broadcast signal-activated electronic door stops. The visual lockdown notification and alert device flashes an LED visual alert in silent mode or sound-activated.

11 Claims, 25 Drawing Sheets

(56) References Cited

U.S. PATENT DOCUMENTS

2014/0354427 A1* 12/2014 Rapaport ............... G08B 21/02
                                                    340/539.31
2016/0232774 A1*  8/2016 Noland .............. G08B 13/1672
2016/0371963 A1* 12/2016 Lyman ................... H04W 4/90
2017/0213429 A1*  7/2017 Marien ................... G08B 5/38

* cited by examiner

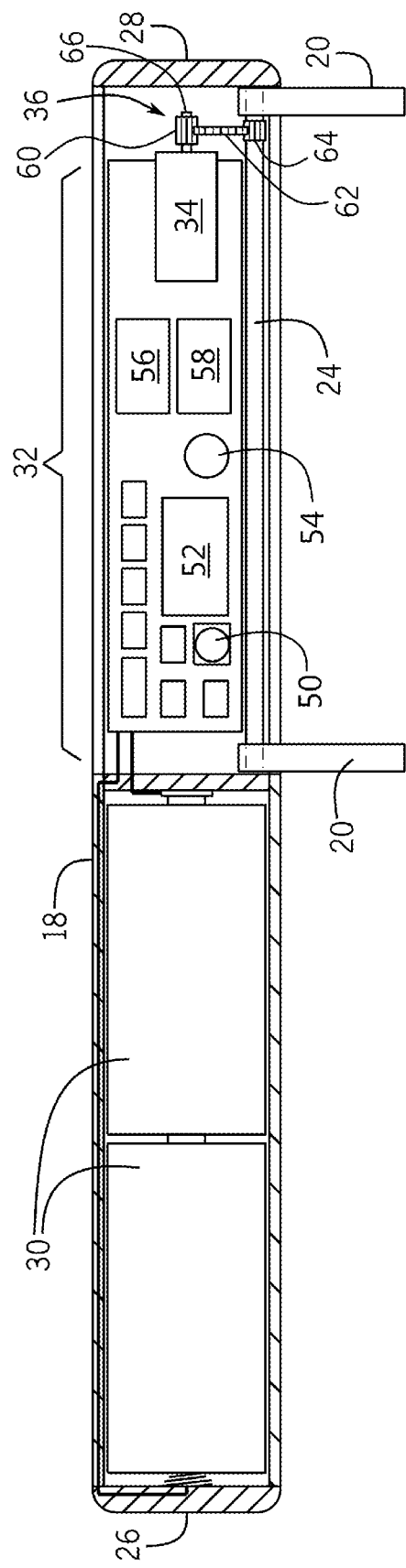
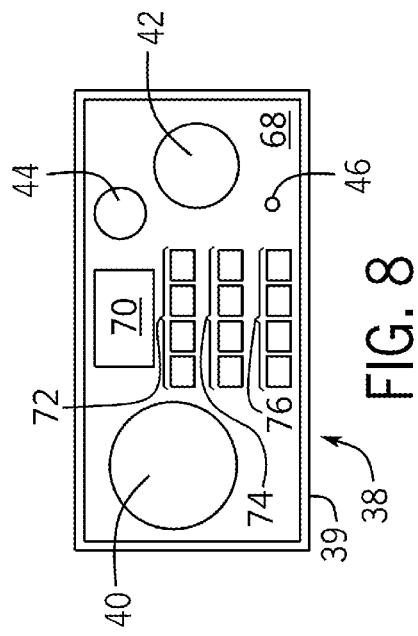
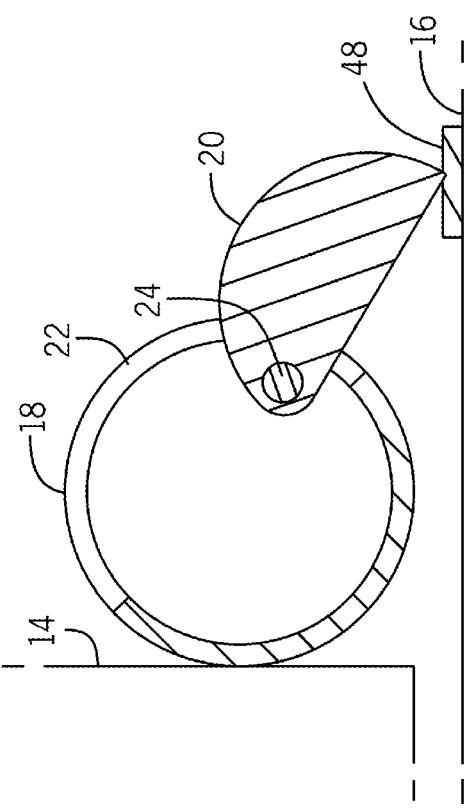
FIG. 6
FIG. 8
FIG. 7

VISUAL LOCKDOWN NOTIFICATION AND ALERT DEVICE, ELECTRONIC DOOR STOP REMOTE BROADCAST DEVICE, SILENT BROADCAST SIGNAL-ACTIVATED ELECTRONIC DOOR STOP, AND SOUND-ACTIVATED REMOTE RELEASE ELECTRONIC DOOR STOP

CLAIM OF BENEFIT TO PRIOR APPLICATIONS

This application is a continuation-in-part of and claims benefit to U.S. Non-Provisional patent application Ser. No. 16/361,495, entitled "ELECTRONIC DOOR STOP REMOTE BROADCAST DEVICE, SILENT BROADCAST SIGNAL-ACTIVATED ELECTRONIC DOOR STOP, AND SOUND-ACTIVATED REMOTE RELEASE ELECTRONIC DOOR STOP," filed Mar. 22, 2019, which is a continuation-in-part of and claims benefit to U.S. Non-Provisional patent application Ser. No. 16/053,184, entitled "SOUND-ACTIVATED REMOTE RELEASE ELECTRONIC DOOR STOP," filed Aug. 2, 2018. The U.S. Non-Provisional patent application Ser. No. 16/361,495 and 16/053,184 are incorporated herein by reference.

BACKGROUND

Embodiments of the invention described in this specification relate generally to door stops, and more particularly, to a visual lockdown notification and alert device that provides visual notification of lockdown in silent mode or by sound activation, an electronic door stop remote broadcast device, a silent broadcast signal-activated electronic door stop, and a sound-activated remote release electronic door stop.

As part of a fire-rated assembly, a door needs to remain shut during a fire to provide integrity in impeding fire and smoke passage. However, people often like to have doors left open or propped open. Thus, when desired, a door is propped open by means of any object that impedes the swing of the door (e.g., door stop, etc.). This presents a problem in terms of fire safety and other emergency situations because leaving the door open during an emergency event allows access to other rooms/areas. In particular, propping a door open allows fire and smoke to access other rooms/areas during a fire and allows intruders access to other rooms/areas during an intruder emergency.

While a person may be able to distinguish the sound of a fire alarm or other alarm and take appropriate action (closing the propped open door to prevent further access), there is no guarantee such a person will be anywhere near such a propped open door in time to close it. Furthermore, expecting a person to close any/all propped open doors limits and/or delays other important and significant actions that should reasonably be performed.

Also, there are some people who cannot hear as well as others and may not realize an alarm is sounding. In other cases, visual notifications and alerts can provide a notification to people that a lockdown scenario is underway without alerting a perpetrator of the lockdown.

Therefore, what is needed is a remote detection device that gets mounted on a propped open door or elsewhere in the vicinity of a door, such that a receiver of the remote detection device can detect an alarm and release the door automatically to achieve closure for fire integrity and intruder prevention, which includes separate channel detection for "silent-release" operation on a broadcast basis as may be triggered by an electronic door stop remote broadcast device, and a visual lockdown notification and alert device.

BRIEF DESCRIPTION

Novel electronic door stop devices, a novel electronic door stop remote broadcast device, and a novel visual lockdown notification and alert device are disclosed. The electronic door stop devices include (i) a sound-activated remote release electronic door stop that automatically detects a particular sound and closes a propped open door and (ii) a silent broadcast signal-activated electronic door stop that provides automatic closing of propped open doors, by both silent broadcast signal and particular sound detection. The electronic door stop remote broadcast device broadcasts a wireless data signal to multiple silent broadcast signal-activated electronic door stops to automatically and concurrently close any doors propped open by the silent broadcast signal-activated electronic door stops. The visual lockdown notification and alert device includes an LED strobe light that provides (i) audibly silent visual notification of lockdown and (ii) sound-activated visual notification of lockdown. In some embodiments, the visual lockdown notification and alert device is a wall-mounted device that is placed along an interior wall of a room with a remote release electronic door stop.

In some embodiments, the sound-activated remote release electronic door stop that automatically detects a particular sound and closes a propped open door is activated by an emergency alarm sound that a receiver of the sound-activated remote release electronic door stop can distinguish the emergency alarm sound from other sounds and release the door automatically to achieve closure for fire integrity and intruder prevention.

In some embodiments, the electronic door stop remote broadcast device that broadcasts a wireless data signal to multiple silent broadcast signal-activated electronic door stops to automatically and concurrently close any doors propped open by the silent broadcast signal-activated electronic door stops is activated when a human operator presses a button on the electronic door stop remote broadcast device. Once activated, the electronic door stop remote broadcast device of some embodiments broadcasts a wireless data signal to the multiple silent broadcast signal-activated electronic door stops, as well as any wireless signal routers and signal repeaters deployed in a coverage area of a personal area network (PAN). In some embodiments, activation of the electronic door stop remote broadcast device releases all of the silent broadcast signal-activated electronic door stops in a building, thereby automatically and silently causing all of the doors in the building to concurrently close.

In some embodiments, the visual lockdown notification and alert device that provides audibly silent visual notification of lockdown is activated in silent mode when a human operator presses a silent visual alert broadcast button on the visual lockdown notification and alert device. In some embodiments, the visual lockdown notification and alert device that provides audibly silent visual notification of lockdown is activated in silent mode when a human operator presses a button on an electronic door stop remote broadcast device to broadcast a wireless data signal to multiple silent broadcast signal-activated electronic door stops to automatically and concurrently close any doors propped open by the silent broadcast signal-activated electronic door stops. Upon activation by human operator, the visual lockdown notification and alert device of some embodiments flashes the LED strobe light and transmits signals to other visual lockdown notification and alert device.

In some embodiments, the visual lockdown notification and alert device that provides sound-activated visual notification of lockdown is activated upon audible detection of a particular sound that closes a door propped open by a sound-activated remote release electronic door stop. Upon sound-based activation, the visual lockdown notification and alert device of some embodiments flashes the LED strobe light and transmits signals to other visual lockdown notification and alert device.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, but which are included to provide a further understanding of the present disclosure, are incorporated in and constitute a part of this specification, illustrate aspects of the present disclosure, and together with the detailed description serve to explain the principles of the present disclosure. No attempt is made to show structural details of the present disclosure in more detail than may be necessary for a fundamental understanding of the present disclosure and the various ways in which it may be practiced. In the drawings:

FIG. 6 conceptually illustrates a top plan view of the sound-activated remote release electronic door stop in some embodiments with parts shown in cross-section.

FIG. 7 conceptually illustrates a cross-sectional view of the sound-activated remote release electronic door stop with adhesive floor patch in some embodiments.

FIG. 8 conceptually illustrates a plan view of a printed circuit board of a sound-activated remote release electronic door stop in some embodiments.

FIGS. 26-29 conceptually illustrate four stages of an unmounted battery-powered mobile EDS remote broadcast device being activated by a teacher on a desk to automatically release silent broadcast signal-activated electronic door stops at all doors in a nearby hallway of a school when an intruder is detected in the hallway.

DETAILED DESCRIPTION

Figure 1:
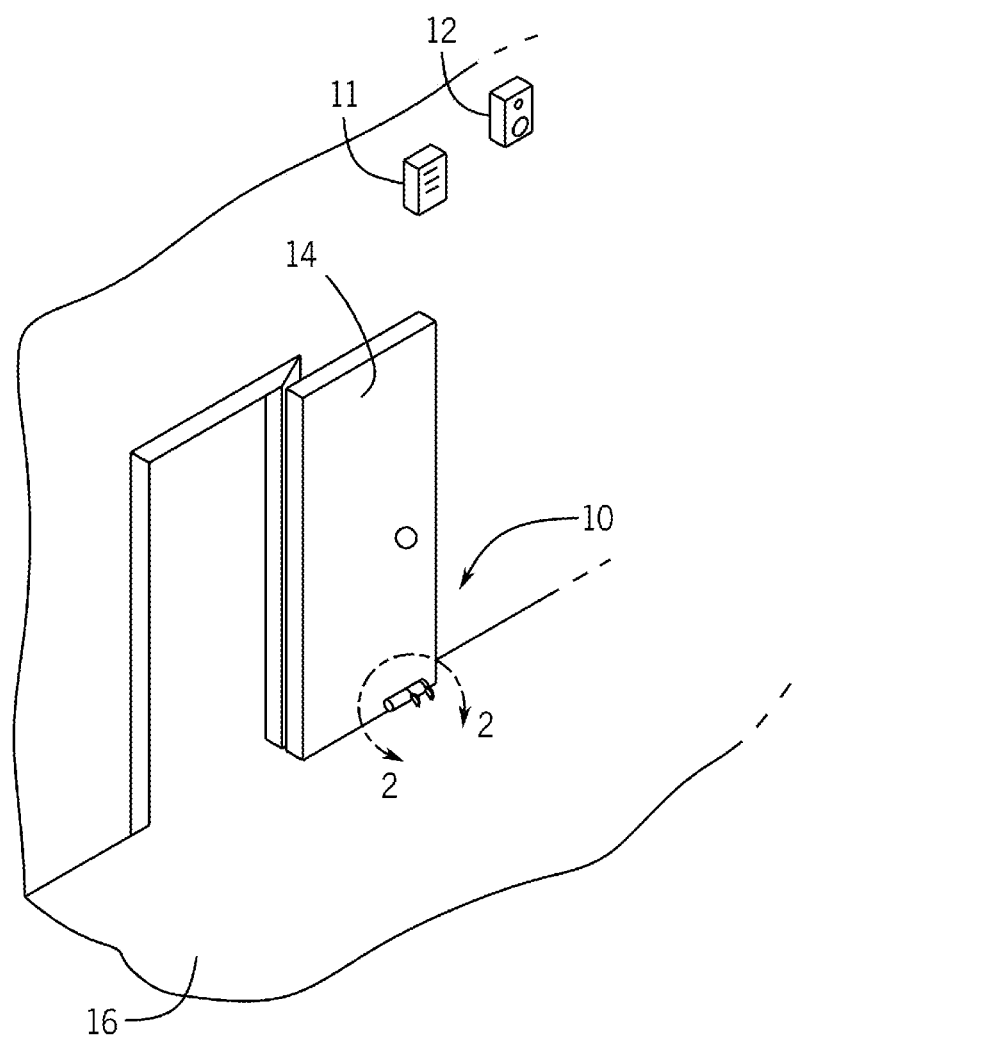
FIG. 1 conceptually illustrates a perspective view of a sound-activated remote release electronic door stop in some embodiments during use in connection with a propped open door.

In the following detailed description of the invention, numerous details, examples, and embodiments of the invention are described. However, it will be clear and apparent to one skilled in the art that the invention is not limited to the embodiments set forth and that the invention can be adapted for any of several applications.

Some embodiments of the invention include novel electronic door stop devices, a novel electronic door stop remote broadcast device, and a novel visual lockdown notification and alert device. The electronic door stop devices include (i) a sound-activated remote release electronic door stop that automatically detects a particular sound and closes a propped open door and (ii) a silent broadcast signal-activated electronic door stop that provides automatic closing of propped open doors, by both silent broadcast signal and particular sound detection. The electronic door stop remote broadcast device broadcasts a wireless data signal to multiple silent broadcast signal-activated electronic door stops to automatically and concurrently close any doors propped open by the silent broadcast signal-activated electronic door stops. The visual lockdown notification and alert device includes an LED strobe light that provides (i) audibly silent visual notification of lockdown and (ii) sound-activated visual notification of lockdown. In some embodiments, the visual lockdown notification and alert device is a wall-mounted device that is placed along an interior wall of a room with a remote release electronic door stop.

In some embodiments, the sound-activated remote release electronic door stop that automatically detects a particular sound and closes a propped open door is activated by an emergency alarm sound that a receiver of the sound-activated remote release electronic door stop can distinguish the emergency alarm sound from other sounds and release the door automatically to achieve closure for fire integrity and intruder prevention.

In some embodiments, the electronic door stop remote broadcast device that broadcasts a wireless data signal to multiple silent broadcast signal-activated electronic door stops to automatically and concurrently close any doors propped open by the silent broadcast signal-activated electronic door stops is activated when a human operator presses a button on the electronic door stop remote broadcast device. Once activated, the electronic door stop remote broadcast device of some embodiments broadcasts a wireless data signal to the multiple silent broadcast signal-activated electronic door stops, as well as any wireless signal routers and signal repeaters deployed in a coverage area of a personal area network (PAN). In some embodiments, activation of the electronic door stop remote broadcast device releases all of the silent broadcast signal-activated electronic door stops in a building, thereby automatically and silently causing all of the doors in the building to concurrently close.

In some embodiments, the visual lockdown notification and alert device that provides audibly silent visual notification of lockdown is activated in silent mode when a human operator presses a silent visual alert broadcast button on the visual lockdown notification and alert device. In some embodiments, the visual lockdown notification and alert device that provides audibly silent visual notification of lockdown is activated in silent mode when a human operator presses a button on an electronic door stop remote broadcast device to broadcast a wireless data signal to multiple silent broadcast signal-activated electronic door stops to automatically and concurrently close any doors propped open by the silent broadcast signal-activated electronic door stops. Upon activation by human operator, the visual lockdown notification and alert device of some embodiments flashes the LED strobe light and transmits signals to other visual lockdown notification and alert device.

In some embodiments, the visual lockdown notification and alert device that provides sound-activated visual notification of lockdown is activated upon audible detection of a particular sound that closes a door propped open by a sound-activated remote release electronic door stop. Upon sound-based activation, the visual lockdown notification and alert device of some embodiments flashes the LED strobe light and transmits signals to other visual lockdown notification and alert device.

As stated above, as part of a fire-rated assembly, a door needs to remain shut during a fire to provide integrity in impeding fire and smoke passage. In addition, educators and education administrators need ways to effectively lock down when intruders or other dangers emerge in and around a school. In some cases, there may be people who need to know about a lockdown scenario but are hard of hearing or cannot sufficiently hear audible alarms (such as in a fire), while in still many other instances, a silent approach to lock down is advised, given that an intruder or perpetrator can be alerted when an audible alarm is sounded, thus giving importance to effective quiet lockdown mechanisms. Embodiments of the electronic door stop remote broadcast device, the sound-activated remote release electronic door stop, and the visual lockdown notification and alert device described in this specification solve such problems by allowing the door to remain open by a person (or "user") while being able to detect a specific sound (i.e., a fire alarm) or trigger a silently broadcast alarm to automatically release the door stop to close the door upon fire danger, intruder danger, or other dangers, and to provide a visual notification and alert for persons unable to sufficiently hear audible alarms and to carry out a silent mode lockdown that effectively informs people that a lockdown scenario is already underway, when no audible alarm is sounding.

I. Sound-Activated Remote Release Electronic Door Stop

Embodiments of the sound-activated remote release electronic door stop described in this specification differ from and improve upon currently existing options. In particular, there are no automatic door release devices in existence which can detect a fire alarm and release a door that has been left open by a user. In fact, none of the conventional door stop devices are capable of detecting an event to release a door. In contrast, the sound-activated remote release electronic door stop of the present disclosure uses a remote detection device mounted on the propped open door or elsewhere, thereby allowing a receiver to distinguish a fire or emergency alarm sound from other sounds and identify the fire or emergency alarm sound as emanating from an alarm and release the door automatically to achieve closure for fire integrity and intruder prevention.

The sound-activated remote release electronic door stop of the present disclosure may be comprised of the following elements. This list of possible constituent elements is intended to be exemplary only and it is not intended that this list be used to limit the sound-activated remote release electronic door stop of the present application to just these elements. Persons having ordinary skill in the art relevant to the present disclosure may understand there to be equivalent elements that may be substituted within the present disclosure without changing the essential function or operation of the sound-activated remote release electronic door stop.

1. Threaded cylinder body end cap
2. Extruded cylinder body
3. End cap contact spring
4. Space for D-Cell batteries (two each)
5. Negative circuit conductor
6. Positive circuit conductor 7. Component printed circuit board (PCB)
8. Potentiometer for a drive unit control
9. Micro-processor unit
10. Lithium battery cell holder
11. Drive capacitor-open
12. Drive capacitor-close
13. Drive unit
14. Main drive gear
15. Secondary drive gear
16. Engagement axle gear
17. Engagement axle shaft
18. Proximal engagement cog
19. Distal engagement cog
20. Sealed cylinder body end cap
21. Remote transceiver body
22. Microphone
23. Micro-processor unit
24. Manual test push button
25. Transistor Bank #1
26. Transistor Bank #2
27. Transistor Bank #3
28. Lithium battery cell holder
29. RGB LED indicator
30. Remote assembly cover
31. Adhesive cog floor patch The various elements of the sound-activated remote release electronic door stop of the present disclosure may be related in the following exemplary fashion. It is not intended to limit the scope or nature of the relationships between the various elements and the following examples are presented as illustrative examples only. By way of example, FIG. 1 conceptually illustrates a perspective view of a sound-activated remote release electronic door stop 10 during use in connection with a propped open door 14. In addition to the door 14, the sound-activated remote release electronic door stop 10 works in connection with an emergency alarm 11 and an electronic door stop alarm detector 12. As shown in this figure, the sound-activated remote release electronic door stop 10 is positioned on a floor 16 at the bottom of the door 14 and manages to keep the door 14 open until the electronic door stop alarm detector 12 detects an alarm sound from the emergency alarm 11.

Figure 2:
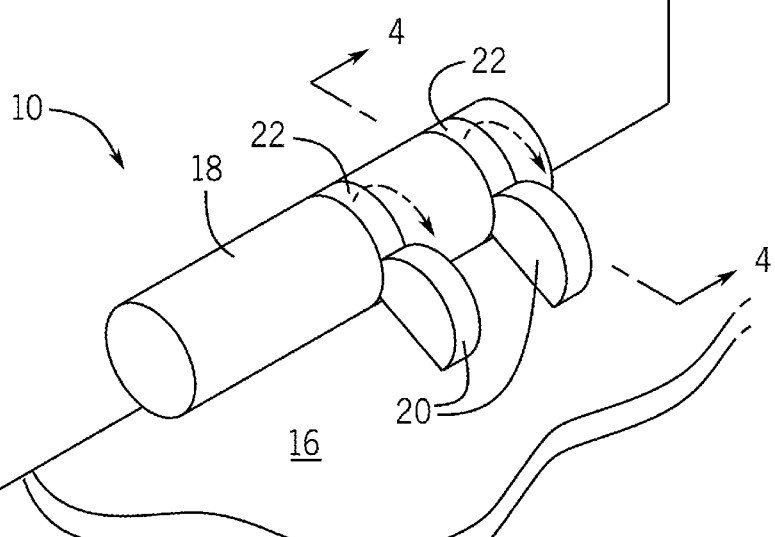
FIG. 2 conceptually illustrates a detailed perspective view of the sound-activated remote release electronic door stop at rest while propping the door open in some embodiments.

Turning to a more detailed example, FIG. 2 conceptually illustrates a detailed perspective view of the sound-activated remote release electronic door stop 10 at rest while propping the door 14 open. As shown in this detailed view, the sound-activated remote release electronic door stop 10 comprises a body 18, a pair of cogs 20, and a pair of slots 22 for the cogs 20. In some embodiments, the cogs 20 have a rounded semi-circle or crescent shape which allows for easy closing into and opening out of the pair of slots 22 (as shown in this figure by the dashed arc arrows). In some embodiments, the body 18 is a cylinder-shaped body for the rounded shape of the cogs 20 to fit snug inside the pair of slots 22 while closed. Thus, the sound-activated remote release electronic door stop 10 is able to prop the door 14 open by letting the cogs 20 out to touch the floor 16. When the door 14 applies pressure to close, the cogs 20 are pushed slightly downward into the floor 16 to prevent the door 14 from closing.

Figure 3:
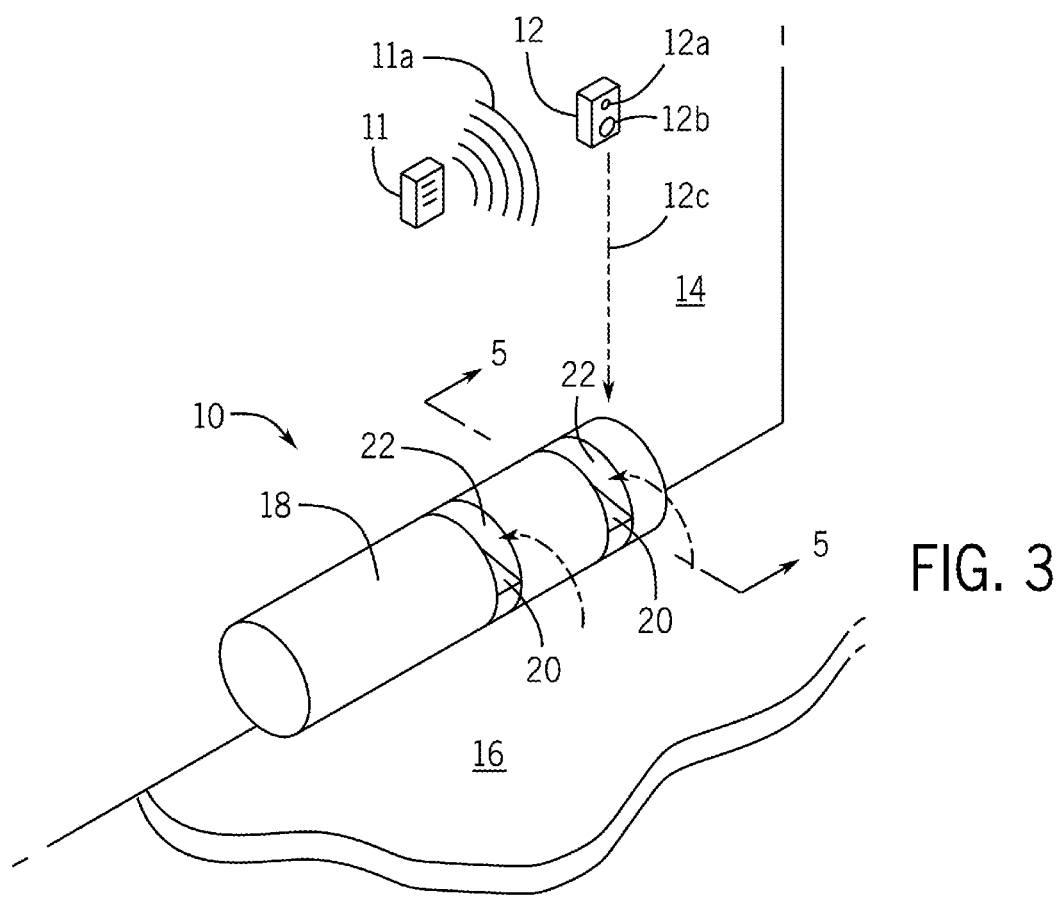
FIG. 3 conceptually illustrates a detailed perspective view of the sound-activated remote release electronic door stop while detecting an emergency alarm and automatically releasing the door stop to close the open door.

Releasing the sound-activated remote release electronic door stop 10 during an emergency (such as a fire) to close the door 14 is demonstrated in FIG. 3, which conceptually illustrates a detailed perspective view of the sound-activated remote release electronic door stop 10 while detecting an emergency alarm and automatically releasing the electronic door stop 10 to close the open door 14. As shown in this figure, when the emergency alarm 11 sounds an audible alarm warning 11a (e.g., a fire alarm), an electronic door stop alarm detector sensor 12a of the electronic door stop alarm detector 12 senses the sounding audible alarm warning (i.e., captures sound waves of the audible alarm warning). An electronic door stop alarm detector transmitter 12b then transmits an electronic door stop alarm detector signal 12c to the sound-activated remote release electronic door stop 10 positioned at the bottom of the door 14 near the floor 16. When the electronic door stop alarm detector signal 12c is received, the sound-activated remote release electronic door stop 10 automatically rotates the cogs 20 back into the cog slots 22 (shown by dashed-line arrows) within the body 18 of the sound-activated remote release electronic door stop 10, thereby freeing the door 14 to close.

Figure 4:
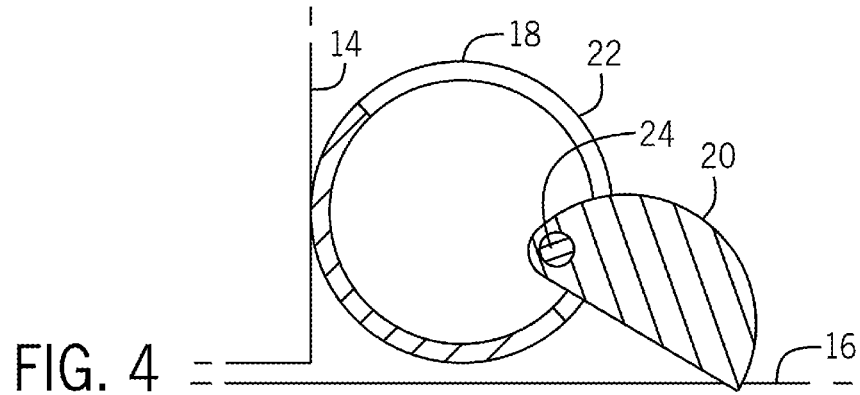
FIG. 4 conceptually illustrates a cross-sectional view of the sound-activated remote release electronic door stop taken along line 4-4 of FIG. 2 at rest and propping the door open.
Figure 5:
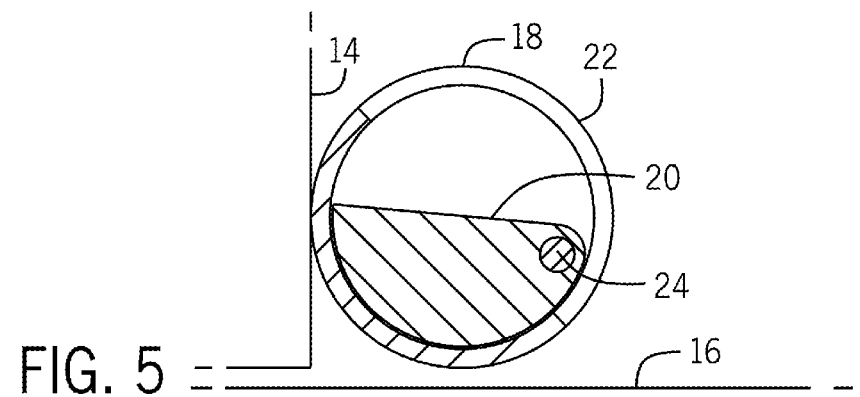
FIG. 5 conceptually illustrates a cross-sectional view of the sound-activated remote release electronic door stop taken along line 5-5 of FIG. 3.

By way of example, and referring to FIGS. 4 and 5, the opening and closing of the cogs 20 demonstrates how the sound-activated remote release electronic door stop 10 is able to prop the door 14 open in a safe way that ensures the door 14 automatically closes when an emergency alarm sounds. In particular, FIG. 4 conceptually illustrates a cross-sectional view of the sound-activated remote release electronic door stop 10 taken along line 4-4 of FIG. 2 at rest and propping the door 14 open. As shown in this figure, the cogs 20 touch the floor 16 in a fully open configuration to prop the door 14 open. An engagement axle shaft 24 (also referred to as pivot rod 24) resides in an extruded slot formed into the body 18 of the sound-activated remote release electronic door stop 10. At either end of the engagement axle shaft 24 (pivot rod 24) are affixed the cogs 20. The engagement axle shaft 24 holds the cogs 20 in position in relation to the body 18 and the cog slots 22 of the sound-activated remote release electronic door stop 10. While the engagement axle shaft 24 allows the cogs 20 to rotate into and out of the slots 22, the body 18 prevents the cogs 20 from rotating beyond a point at which engagement with the floor 16 is made.

By contrast, FIG. 5 conceptually illustrates a cross-sectional view of the sound-activated remote release electronic door stop 10, taken along line 5-5 of FIG. 3, in a fully closed configuration to release and close the door 14 in line with emergency requirements, such as fire safety. As shown in this figure, the cogs 20 rest inside the body 18 of the sound-activated remote release electronic door stop 10 by pivoting off the floor 16, via the engagement axle shaft 24, and into the cog slots 22. Thus, when the cogs 20 are off the floor 16 and resting inside the body 18, the sound-activated remote release electronic door stop 10 is cleared from the floor 16 (free space with no engagement with the floor 16), thereby allowing the door 14 to automatically close by its own pressure mechanism.

Now turning to another example, FIG. 6 conceptually illustrates a top plan view of the sound-activated remote release electronic door stop 10 with parts shown in cross-section. As shown in this figure, the sound-activated remote release electronic door stop 10 has a cylinder body 18 that houses several electrical and mechanical components. The cylinder body 18 is closed off at both ends by end caps, including a first end cap 26 and a second end cap 28. In some embodiments, the first end cap 26 is a removable threaded cylinder cap 26 where two batteries 30 are inserted and held in place as a battery stack. In some embodiments, the batteries are D-cell batteries. In some embodiments, the positive end of the battery stack contacts a positive circuit conductor inside the cylinder body 18, and a negative end of the battery stack contacts an end cap contact spring disposed to an inner side of the first end cap 26 and is affixed to a negative circuit conductor. The battery stack provides power to the sound-activated remote release electronic door stop 10 by way wires that connect the two circuit conductors to a first printed circuit board 32 (the first "PCB" 32). In some embodiments, the battery stack provides 5 vdc to the first PCB 32 for operation of the sound-activated remote release electronic door stop 10. Mounted on the first PCB 32 are several components, including a potentiometer for drive unit control 50, a micro-processor for logic storage 52, a lithium battery cell holder 54 to provide back-up power at end-of-life, an OPEN capacitor 56 to provide power upon load, and a CLOSE capacitor 58 to provide power upon load. A drive unit 34 is securely fastened at the distal end of the first PCB 32. A gear train 36 extends off a drive unit shaft 66. The gear train 36 includes a main drive gear 60, a secondary drive gear 62, and an engagement axle gear 64. The main drive gear 60 extends directly off the drive unit shaft 66 and interfaces with a secondary drive gear 62. The secondary drive gear 62 meshes to the engagement axle gear 64 which is embossed into the engagement axle shaft 24 (pivot rod 24). The engagement axle shaft 24 resides in an extruded slot formed into the body 18 of the sound-activated remote release electronic door stop 10. The cogs 20 are disposed onto the two ends of the engagement axle shaft 24. Specifically, one cog 20 is affixed at the proximal end of the engagement axle shaft 24 and the other cog 20 is affixed at the distal end of the engagement axle shaft 24.

In some embodiments, a pair of adhesive floor patches are included with the entire packaged sound-activated remote release electronic door stop assembly, which will be affixed to solid-surface floors to provide a positive interface for the cogs of the sound-activated remote release electronic door stop to intercept and secure anchorage. In some embodiments, a desired standby function of the sound-activated remote release electronic door stop works by way of an EDS unit that is placed at a bottom location of an opened door, with the cogs deployed to interlock the door from closing via automatic door closer devices.

By way of example, FIG. 7 conceptually illustrates a cross-sectional view of the sound-activated remote release electronic door stop 10 with an exemplary adhesive floor patch 48 placed at a bottom location of an opened door 14 so that a cog 20 engages with the adhesive floor patch 48 when propping the door 14 open.

In some embodiments, a desired active function of the sound-activated remote release electronic door stop 10 works by way of the electronic door stop alarm detector 12 which includes the remote transceiver (or the transmitter 12b). As a functional unit, the electronic door stop alarm detector 12 includes a remote transceiver printed circuit board, which detects a fire alarm siren, whistle, or klaxon pulse and issues a "Close" or "Release" signal to the sound-activated remote release electronic door stop 10. By way of example, FIG. 8 conceptually illustrates a plan view of a remote transceiver printed circuit board 38 of a sound-activated remote release electronic door stop 10. As shown in this figure, the remote transceiver printed circuit board 38 is a separate assembly comprising a printed circuit board 68 foundation. On the printed circuit board 68 is a pickup microphone 40, a microprocessor unit 70, a manual test button 42, a first transistor bank 72, second transistor bank 74, and a third transistor bank 76. All of these components are interconnected to the printed circuit board 68, and are powered by a lithium battery 44. An LED indicator 46 is positioned on the printed circuit board 68 to present operational status of the assembly, e.g., GREEN for ready, RED for active, and BLUE for fault. In some embodiments, the remote transceiver printed circuit board 38 is entirely protected by a cover housing 39 that snaps onto the printed circuit board 68 foundation.

In view of the examples described above by reference to FIGS. 1-8, then, a person would use the sound-activated remote release electronic door stop 10 with a door assembly that is equipped with an automatic closer. The door can be fully opened by the person, and then propped open by releasing the cogs from the cog slots of the sound-activated remote release electronic door stop 10. When the cogs 20 engage with the floor 16 or with adhesive floor patches 48 on the floor 16, the door 14 would be securely propped open, ready to be released when an alarm sounds. As the sound-activated remote release electronic door stop 10 is equipped with two D-cell batteries 30 and a lithium battery 44, there is ample power to operate the unit.

When ready for operation, the sound-activated remote release electronic door stop 10 can be commanded to OPEN status by the remote transceiver printed circuit board 38 operating in close proximity (e.g., within 20 lineal feet). The sound-activated remote release electronic door stop 10 will deploy the cogs 20 by rotating them on the engagement axle shaft 24 housed within the body 18. In some embodiments, the sound-activated remote release electronic door stop 10 can be affixed to the bottom of the door as a permanent fixture or semi-permanent installation. In some embodiments, the sound-activated remote release electronic door stop 10 can be used as desired, being added to the door when needed and removed when no longer in use. When the sound-activated remote release electronic door stop 10 is used as desired, the user will place body of the sound-activated remote release electronic door stop 10 at the base of the opened door, with the cogs 20 deployed. An alarm and remote detection unit should be present and nearby (as noted above, within about 20 lineal feet). During such usage, the two cogs 20 will engage the floor (carpeted or with adhesive patch) with a single tooth to prevent the sound-activated remote release electronic door stop 10 from rolling by the force of the door opener. In the case of smooth floor surface, the user will affix the adhesive floor patches 48 to the floor in alignment with the cogs 20 to provide for a positive interface between the floor and the cogs 20. In this state, the sound-activated remote release electronic door stop 10 remains in place for as long as desired by the user, and the door is held open.

In the event of a fire alarm, the remote transceiver printed circuit board 38 picks up the harmonic sound vibrations with the pickup microphone 40 and compares to the data stored in the microprocessor unit 70. If the sound resembles the prescribed parameters of an alarm state, the microprocessor unit 70 broadcast the ACTIVE command signal. The sound-activated remote release electronic door stop 10 receives the signal via the first printed circuit board 32 and the signal is then interpreted by the microprocessor unit 70. Upon confirmation of the signal parameters, the microprocessor unit 70 closes the circuitry to the close capacitor 58, the potentiometer 50, and the drive unit 34. The drive unit 34 is powered positively to turn the main drive gear 60, which interfaces to the secondary drive gear 62, which interfaces to the engagement axle gear 64 thereby rotating the engagement axle shaft 24 in such fashion to retract the two engagement cogs 20.

In some embodiments, the body 18 of the sound-activated remote release electronic door stop 10 presents as a smooth round cylinder which poses no resistance for the automatic door closer to operate. Thus, when the door begins to swing closed, the sound-activated remote release electronic door stop 10 rolls along at the bottom. The door continues to roll toward complete closure, while rolling the sound-activated remote release electronic door stop 10 out of the way. The action completes with the door swinging completely closed, fully-engaging with the door hardware to provide a locked or unlocked condition as predetermined by the user of the space.

In some embodiments, the sound-activated remote release electronic door stop 10 utilizes a two-tiered power source. Primary power, as provided by the D-cell batteries 30, is first sampled, and if adequate within set parameters, then the sound-activated remote release electronic door stop 10 is configured for operation. When the primary power (as sampled) is not adequate or becomes inadequate due to prolonged use, then the sound-activated remote release electronic door stop 10 is integrally de-activated and the cogs 20 will not extend. If they were already engaged to the floor in an extended position, then a secondary power (of the two-tiered power source) is supplied by the lithium battery 44 cell, thereby allowing the sound-activated remote release electronic door stop 10 to retract the cogs.

In some embodiments, a signal transmits from remote sensor to main unit, and micro-processor begins sub-routine for cog deployment. The drive unit is energized for a set period of time, and the cogs 20 rotate out of the slots 22 of the cylinder body 18. The potentiometer 50 allows for speed adjustment factory-settings. Upon time-out, the processor closes sub-routine. The cogs 20 are held in position by drive unit resistance.

To make the sound-activated remote release electronic door stop 10 of the present disclosure, the cylinder body may be manufactured by an extrusion process in which the extruded body would have slots inside the body for placement of various components during later assembly. After the extrusion process, the body would be precisely cut at two locations to fashion slots for the engagement cogs to extend through. The cylinder body would have an enlarged receiver recessed into the body at one of the body (e.g., having size of 0.125") to tightly fit to the sealed cylinder body end cap (i.e., the first end cap 26) after component assembly, while the other end of the body would be internally threaded (e.g., having size of 0.375") to receive the threaded cylinder body end cap (i.e., the second end cap 28) after complete device assembly.

The component printed circuit board (i.e., the first printed circuit board 32) may be manufactured as a complete assembly with all the assembly components permanently residing on it (i.e., the potentiometer for drive unit control 50, the micro-processor for logic storage 52, the lithium battery cell holder 54 to provide back-up power at end-of-life when D-cell battery power is drained, the OPEN capacitor 56, the CLOSE capacitor 58, and the drive unit 34). This sub-assembly may be manufactured separately as a completed device designed specifically for the sound-activated remote release electronic door stop 10, and would be fully inserted into the designated slots inside the cylinder body 18 from the end of the body 18 that is covered by the second threaded end cap 28. A negative circuit conductor is a rigid bus component that may be inserted from the end of the body 18 that is covered by the first threaded end cap 26.

Additional circuitry and logic may be included to supplement the original detection and operation of an emergency event. For example, a different frequency reception may be incorporated to command the device to operate similarly but as a result of a completely different protocol. Instead of detection and operation during a fire alarm event, a separate frequency detection could operate the device as result of an intrusion detection, an active-shooter event, or other crowd-control measures. Furthermore, the internal devices may be rearranged in differing positions relative to each other within the housing assembly. The engagement cogs may take different shapes, but with the intent to make a positive and resistive engagement to the adjacent floor is requisite.

To use the sound-activated remote release electronic door stop 10 of the present disclosure, a person may install two D-cell batteries 30 through the end of the body 18 covered by the first end cap 26. After new battery insertion, an occupant of a room or space equipped with a self-closing door would active the sound-activated remote release electronic door stop 10 to extend the engagement cogs 20 out of the body 18 housing through the cog slots 22. Then, the sound-activated remote release electronic door stop 10 would be placed at the interface of the open door 14 relative to the floor 16 in such a fashion as to prop the door 14 open by engagement of the cogs 20 with the floor 16. If the floor 16 is a hard or slippery surface, placement of the optional adhesive patch 48 onto the cleaned floor would provide a positive engagement surface for the cogs 20 to resist the door-closing pressure. The second piece of the sound-activated remote release electronic door stop 10 assembly is the remote receiver (i.e., the remote transceiver printed circuit board 38), which the person may activate with a new power cell. The person would place the remote receiver adjacent to and within approximately ten-twenty feet of the door frame. A simple test-cycle of the receiver would confirm the receipt of a release signal from the receiver to the sound-activated remote release electronic door stop 10, resulting in the door self-closing as designed.

II. Electronic Door Stop Remote Broadcast Device and Silent Broadcast Signal-Activated Electronic Door Stop In some embodiments, the electronic door stop remote broadcast device that broadcasts a wireless data signal to multiple silent broadcast signal-activated electronic door stops to automatically and concurrently close any doors propped open by the silent broadcast signal-activated electronic door stops is activated when a human operator presses a button on the electronic door stop remote broadcast device. Once activated, the electronic door stop remote broadcast device of some embodiments broadcasts a wireless data signal to the multiple silent broadcast signal-activated electronic door stops, as well as any wireless signal routers and signal repeaters deployed in a coverage area of a personal area network (PAN). In some embodiments, activation of the electronic door stop remote broadcast device releases all of the silent broadcast signal-activated electronic door stops in a building, thereby automatically and silently causing all of the doors in the building to concurrently close.

By way of example, FIGS. 9-12 conceptually illustrate different views of an electronic door stop (EDS) remote broadcast device. In some embodiments, the EDS remote broadcast device broadcasts a signal for all electronic door stops in a defined personal area network (PAN). In some embodiments, the EDS remote broadcast device includes a transmitter that broadcasts the signal in at least one of three frequency bands defined by IEEE 802.15.4. The three frequency bands defined by IEEE 802.15.4 include 868 MHz, 915 MHz, and 2.4 GHz. In some embodiments, the PAN operates in one of three network topologies including peer-to-peer, mesh network, and star network. The peer-to-peer topology is a modified mesh network configuration in which no wireless signal repeater device is deployed. Instead, the electronic door stops all include transceivers that both receive and transmit signals over the PAN. In contrast, the mesh network includes wireless signal repeater devices that are deployed at strategic locations to ensure complete broadcast coverage over an entire building or facility, such as a school. The star network includes a coordinator device with a high powered transceiver that receives signals from any of the EDS remote broadcast devices and broadcasts the signal out to all of the electronic door stops.

Figure 9:
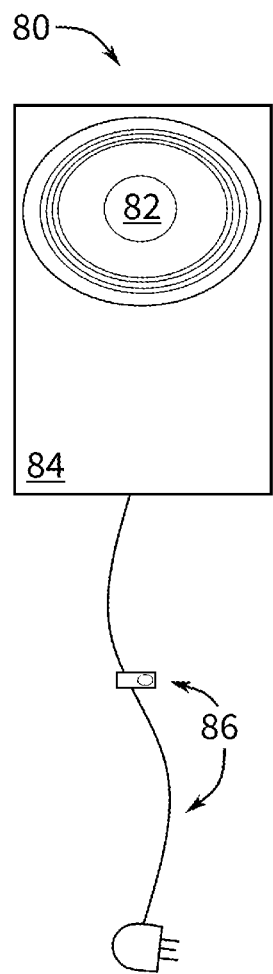
FIG. 9 conceptually illustrates a plan view of an electronic door stop (EDS) remote broadcast device in some embodiments.
Figure 10:
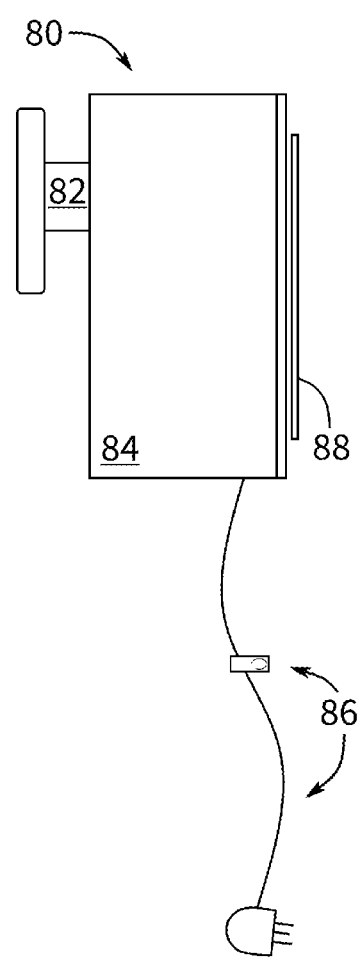
FIG. 10 conceptually illustrates a side view of the EDS remote broadcast device in some embodiments.

Turning first to FIG. 9, which conceptually illustrates a plan view of an EDS remote broadcast device 80. As shown in this figure, the EDS remote broadcast device 80 includes a push button 82, a device enclosure 84, and a power cord 86 that includes a cord with a plug and a cord support clip. Now in relation to FIG. 10, which conceptually illustrates a side view of the EDS remote broadcast device 80, an adhesive backing 88 is shown. The adhesive backing 88 allows the EDS remote broadcast device 80 to be mounted to a surface, such as a wall.

Figure 11:
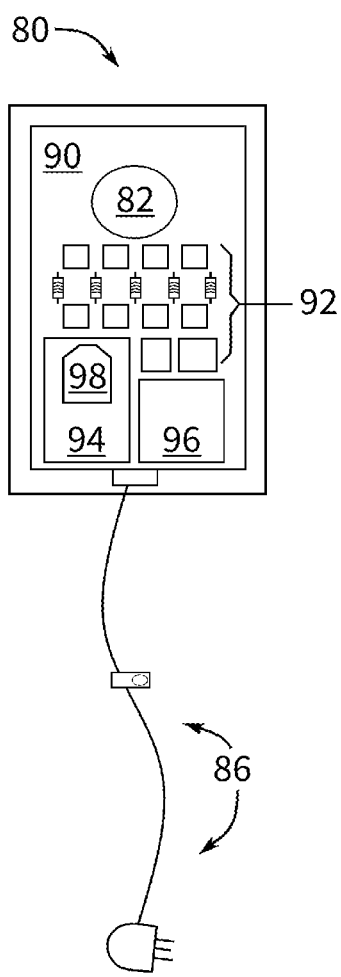
FIG. 11 conceptually illustrates a plan view of a printed circuit board of the EDS remote broadcast device in some embodiments when an outer housing of the EDS remote broadcast device is removed.
Figure 12:
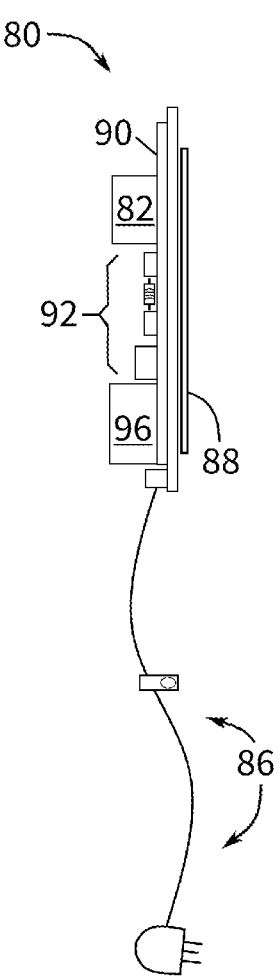
FIG. 12 conceptually illustrates a side view of the printed circuit board of the EDS remote broadcast device in some embodiments when the outer housing of the EDS remote broadcast device is removed.

By way of another example, FIG. 11 conceptually illustrates a plan view of a printed circuit board 90 that is internally present in the EDS remote broadcast device 80. As shown in this figure, the device enclosure 84 of the EDS remote broadcast device 80 has been removed to show an internal view that clearly demonstrates the printed circuit board 90. The printed circuit board 90 includes the push button 82, several circuit board components 92, a programmable micro-processor 94, a power transformer 96, and a wireless RF transceiver 98. By way of reference, FIG. 12 conceptually illustrates a side view of the printed circuit board 90 of the EDS remote broadcast device 80 when the device enclosure 84 is removed, and the adhesive backing 88 present.

Figure 13:
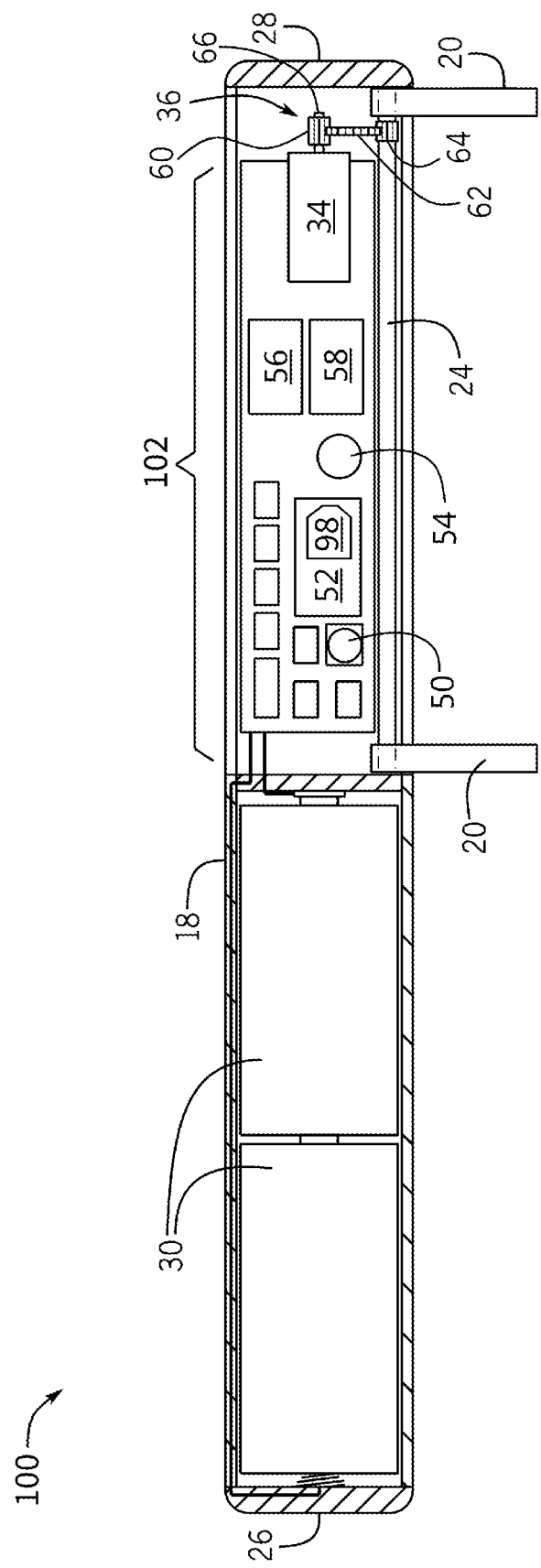
FIG. 13 conceptually illustrates a top plan view of a silent broadcast signal-activated electronic door stop in some embodiments.

Now turning to another example, FIG. 13 conceptually illustrates a top plan view of a silent broadcast signal-activated electronic door stop 100 that provides both silent broadcast signal-activated remote release of cogs 20 and sound-activated remote release of cogs 20 (as in the sound-activated remote release electronic door stop 10 described above by reference to FIGS. 1-8). As shown in this figure, the silent broadcast signal-activated electronic door stop 100 has a cylinder body 18 that is closed off at both ends by a first end cap 26 and a second end cap 28 and which houses several electrical and mechanical components, which are powered by battery power, such as the two batteries 30 shown in this figure (i.e., a battery stack of two D-cell batteries). The battery stack provides power to the silent broadcast signal-activated electronic door stop 100 by way of wires that connect to a second printed circuit board 102 (the second "PCB" 102). The second PCB 102 differs from the first PCB 32, described above by reference to FIG. 6, in that the second PCB 102 includes a wireless RF transceiver 98. Specifically, the wireless RF transceiver 98 includes an RF antenna and is connected to the micro-processor 52. The wireless RF transceiver 98 can be connected as an embedded component of the micro-processor 52 to form a system-on-chip (SoC) for wireless logic processing and micro-control according to the IEEE 802.15.4 wireless communication specification. Alternatively, the wireless RF transceiver 98 can be connected to a shield board that provides an interface to the micro-processor 52. For example, a shield interface board allows connection and communication between the wireless RF transceiver 98 and the micro-processor 52 when the wireless RF transceiver 98 is an XBee transceiver that implements the Zigbee protocol stack (Zigbee application layer, Zigbee network layer, 802.15.4 MAC layer, and 802.15.4 physical layer) and when the micro-processor 52 is an Arduino micro-processor. In yet another configuration, the wireless RF transceiver 98 can be connected directly to the second PCB 102 with embedded communication wires to the micro-processor 52.

Similar to the sound-activated remote release electronic door stop 10 described above by reference to FIG. 6, the silent broadcast signal-activated electronic door stop 100 includes several other components mounted on the second PCB 102, including the potentiometer for drive unit control 50, the lithium battery cell holder 54 to provide back-up power at end-of-life, the OPEN capacitor 56 to provide power upon load, and the CLOSE capacitor 58 to provide power upon load. The drive unit 34 is securely fastened at the distal end of the second PCB 102. The gear train 36 extends off a drive unit shaft 66 and includes a main drive gear 60, a secondary drive gear 62, and an engagement axle gear 64. The main drive gear 60 extends directly off the drive unit shaft 66 and interfaces with a secondary drive gear 62. The secondary drive gear 62 meshes to the engagement axle gear 64 which is embossed into the engagement axle shaft 24 (pivot rod 24). The engagement axle shaft 24 resides in an extruded slot formed into the body 18 of the silent broadcast signal-activated electronic door stop 100. The cogs 20 are disposed onto the two ends of the engagement axle shaft 24. Specifically, one cog 20 is affixed at the proximal end of the engagement axle shaft 24 and the other cog 20 is affixed at the distal end of the engagement axle shaft 24.

In some embodiments, the silent broadcast signal-activated electronic door stop 100 can be configured as an end device that only receives wireless data from transmitting devices or as a fully-functional device that both sends and receives wireless data to and from other devices in any personal area network (PAN) of which the silent broadcast signal-activated electronic door stop 100 is a member. For example, the silent broadcast signal-activated electronic door stop 100 can be configured as an end device with limited communication in a PAN with a star network topology in which a single coordinator device sends data to all the other devices in the PAN. In another example, the silent broadcast signal-activated electronic door stop 100 can be configured as a fully-functional device in a PAN with a mesh network topology in which the silent broadcast signal-activated electronic door stop 100 can receive data from a coordinator device in the PAN or from other fully-functional devices in the PAN and can send data to both end devices and other fully-functional devices in the PAN. In yet another example, the silent broadcast signal-activated electronic door stop 100 can be configured as a fully-functional device in a PAN that employs peer-to-peer communication between multiple silent broadcast signal-activated electronic door stops 100 (e.g., a modified mesh network in which there are no repeater/router devices or few repeater/router devices to simply pass on data to other end devices).

Several examples of different network configurations of different deployments of EDS remote broadcast devices and silent broadcast signal-activated electronic door stops are described in the next section, including an example of a peer-to-peer configured personal area network, a mesh network deployment, and a star network configuration, as well as an alternative version of the EDS remote broadcast device.

III. Exemplary Network Configurations for the EDS Remote Broadcast Device and the Silent Broadcast Signal-Activated Electronic Door Stop By way of example, FIGS. 14-17 conceptually illustrate a peer-to-peer configuration of the EDS remote broadcast device shown in four stages in which the EDS remote broadcast device triggers a signal to multiple silent broadcast signal-activated electronic door stops that automatically release to concurrently close all doors of a school during lockdown when an unauthorized intruder enters the school.

Figure 14:
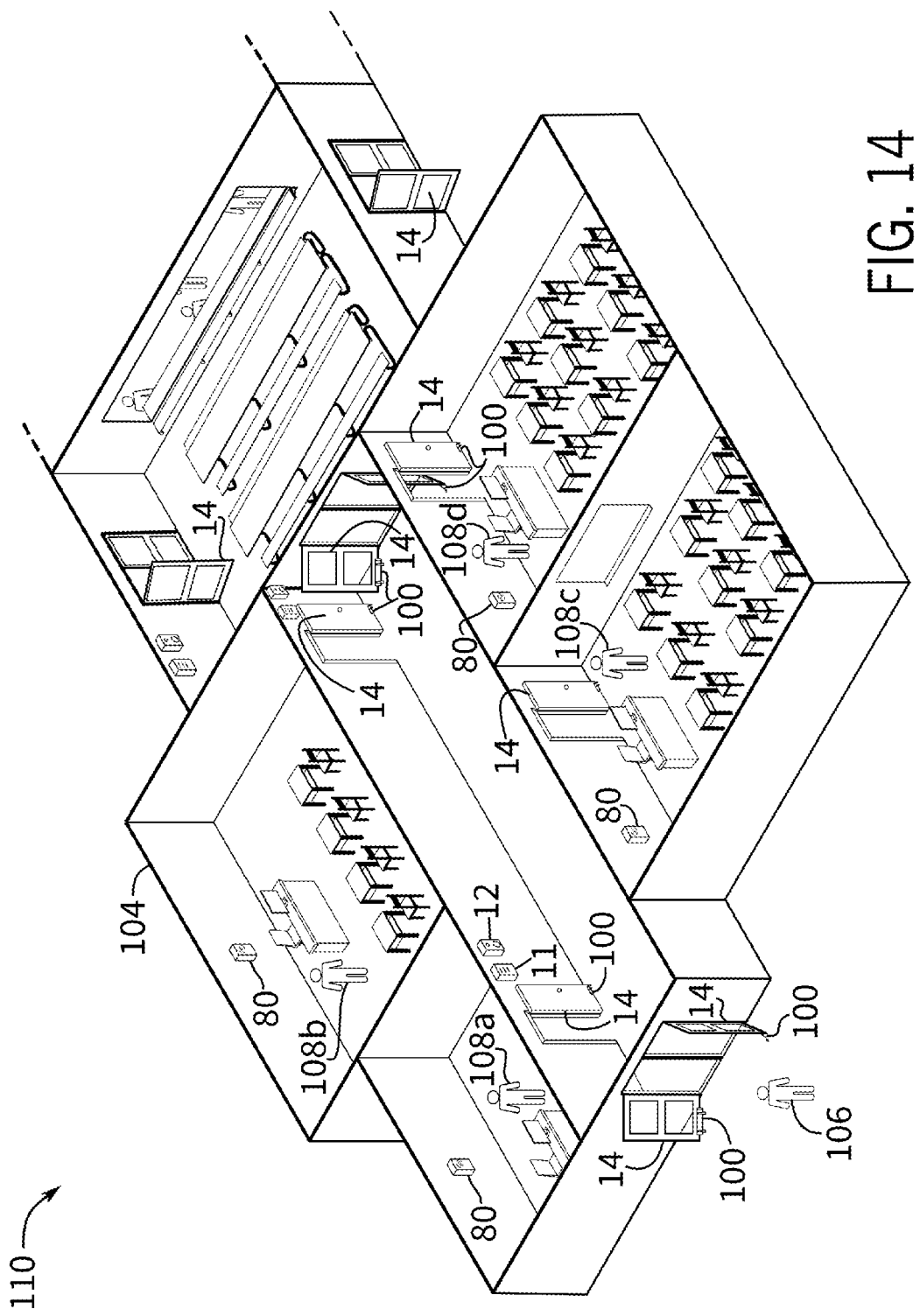
FIGS. 14-17 conceptually illustrate a peer-to-peer configuration of the EDS remote broadcast device shown in four stages in which the EDS remote broadcast device triggers a signal to multiple silent broadcast signal-activated electronic door stops that automatically release to concurrently close all doors of a school during lockdown when an unauthorized intruder enters the school.

Referring first to FIG. 14, which conceptually illustrates a first peer-to-peer stage 110 in which the EDS remote broadcast device triggers a signal to multiple silent broadcast signal-activated electronic door stops that automatically release to concurrently close all doors of a school during lockdown when an unauthorized intruder enters the school. As shown in this figure, the first peer-to-peer stage 110 includes a school 104, several open doors 14, several silent broadcast signal-activated electronic door stops 100 which prop open the doors 14, several emergency alarms 11 and electronic door stop alarm detectors 12 (used in connection with the sound-activated electronic door stop 10 described above by reference to FIGS. 1-8, and also functionally capable of use in connection with the silent broadcast signal-activated electronic door stop 100 described above by reference to FIG. 13), several EDS remote broadcast devices 80 mounted on walls in several classrooms or office rooms that each have propped open doors 14, an unauthorized intruder 106, and authorized school personnel 108a, 108b, 108c, and 108d.

The several open doors 14 include doors 14 at exterior double door entries, interior doors 14, and interior double doors 14 such as those leading into and out of a school cafeteria, which itself has two sets of exterior double door entries, each with a door propped open by a silent broadcast signal-activated electronic door stop 100 (but not shown due to the angle of viewing perspective shown in FIGS. 14-25).

The authorized school personnel 108a, 108b, 108c, and 108d are each shown in a classroom or office. The authorized school personnel 108a, 108b, 108c, and 108d may be teachers, administrators, school board personnel, teaching assistants, school security personnel, or other individuals authorized to be in the school 104 and to trigger any of the EDS remote broadcast devices 80 when a dangerous situation occurs or is suspected, such as an unauthorized intruder 106 entering the school 104, or a student or another authorized school personnel individual is engaged in violence or harm to people or property at the school 104.

In this first peer-to-peer stage 110, the unauthorized intruder 106 is outside of the school 104 with all doors 14 propped open by silent broadcast signal-activated electronic door stops 100. Also, all of the authorized school personnel 108a, 108b, 108c, and 108d are engaged in routine school work in their respective classrooms or offices, such as teaching students (students not shown in any of the FIGS. 14-25 so as not to overburden, needlessly complicate, and/or obscure the representational depictions in the drawings of these figures) or performing routine administrative work. In essence, none of the authorized school personnel 108a, 108b, 108c, and 108d are aware of (or would be aware of) any lurking danger of the unauthorized intruder 106.

Figure 15:
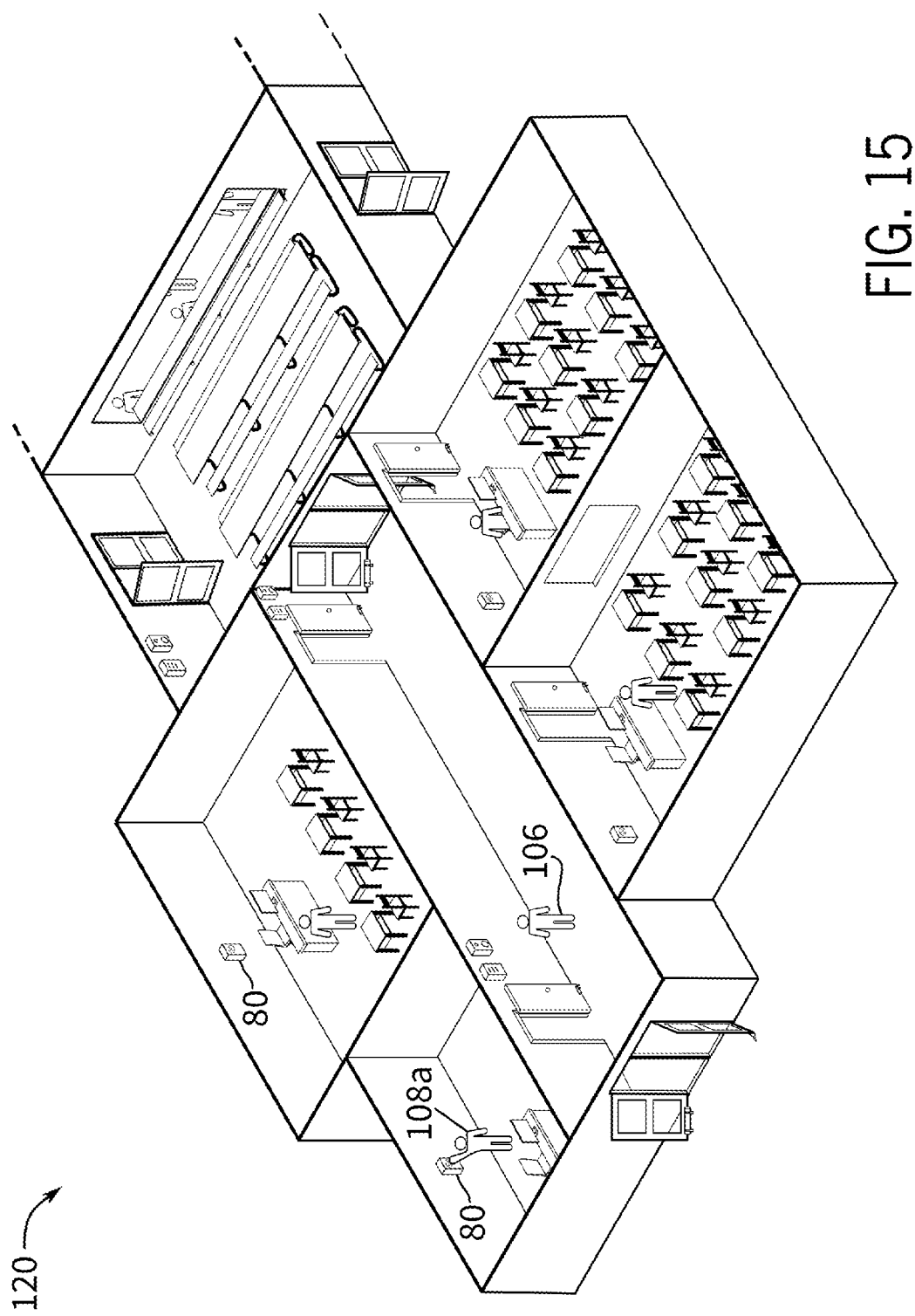

However, such routine work changes into an awareness of a potential dangerous situation in the next example demonstrated in FIG. 15, which conceptually illustrates a second peer-to-peer stage 120 in which the EDS remote broadcast device triggers a signal to multiple silent broadcast signal-activated electronic door stops that automatically release to concurrently close all doors of a school during lockdown when an unauthorized intruder enters the school. Specifically, as the unauthorized intruder 106 walks into the front double door entryway of the school 104 and walks down the hall, authorized school personnel 108a notices the unauthorized intruder 106 and becomes aware of a potential dangerous situation, or suspects a dangerous situation. For example, the unauthorized intruder 106 may be carrying a gun or a knife, which would visibly indicate the potential danger to authorized school personnel 108a. In response to the awareness of the potential danger, the authorized school personnel 108a proceeds to press the push button 82 of the EDS remote broadcast device 80 that is mounted on the wall in the room of authorized school personnel 108a.

Figure 16:
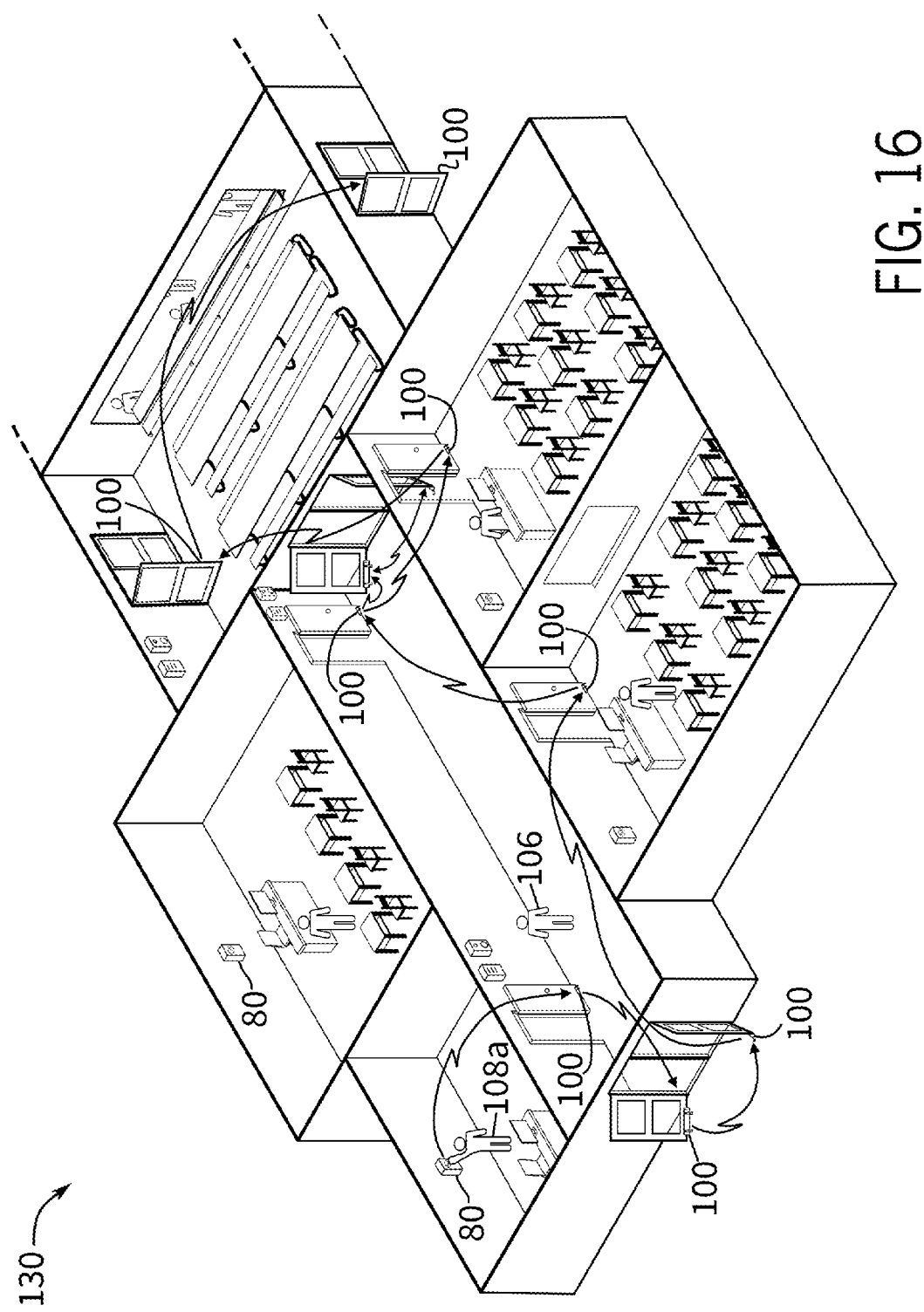

Now referring to FIG. 16, which conceptually illustrates a third peer-to-peer stage 130 in which the EDS remote broadcast device triggers a signal to multiple silent broadcast signal-activated electronic door stops that automatically release to concurrently close all doors of a school during lockdown when an unauthorized intruder enters the school. As shown in this figure, the third peer-to-peer stage 130 demonstrates the silent nature of the signal that is transmitted to all of the silent broadcast signal-activated electronic door stops 100 when authorized school personnel 108a presses the push button 82 of the EDS remote broadcast device 80. Specifically, a wireless signal is immediately transmitted by the wireless RF transceiver 98 of the EDS remote broadcast device 80 to a first silent broadcast signal-activated electronic door stop 100. The wireless signal is broadcast by the EDS remote broadcast device 80 in one of three frequency bands defined by IEEE 802.15.4, including 868 MHz, 915 MHz, and 2.4 GHz. The first silent broadcast signal-activated electronic door stop 100 then re-transmits the signal (re-broadcasts the signal), such that a second silent broadcast signal-activated electronic door stop 100 receives the signal, and so on and so forth, until all of the silent broadcast signal-activated electronic door stops 100 have received the signal. The transmission rate of the wireless RF signal is almost instantaneous. Therefore, all of the silent broadcast signal-activated electronic door stops 100 receive the signal within an amount of time generally undetectable to a human observer, such as the unauthorized intruder 106 or any of the authorized school personnel 108a, 108b, 108c, and 108d. Furthermore, the signal is completely silent to any human observer. Thus, the unauthorized intruder 106 has no awareness that a lockdown at the school 104 has been triggered by the authorized school personnel 108a pressing the push button 82 of the EDS remote broadcast device 80. Indeed, none of the other authorized school personnel 108b, 108c, and 108d, or anyone else in the school 104 would be aware that lockdown has just be triggered due to a dangerous situation or suspected dangerous situation brought about by the unauthorized intruder 106 entering the open school 104. The ability to silently trigger the lockdown protocol of closing all the school doors 14 is key, so as to ensure maximum safety of all students and school personnel without needlessly alerting those dangerous individuals, such as unauthorized intruder 106.

Figure 17:
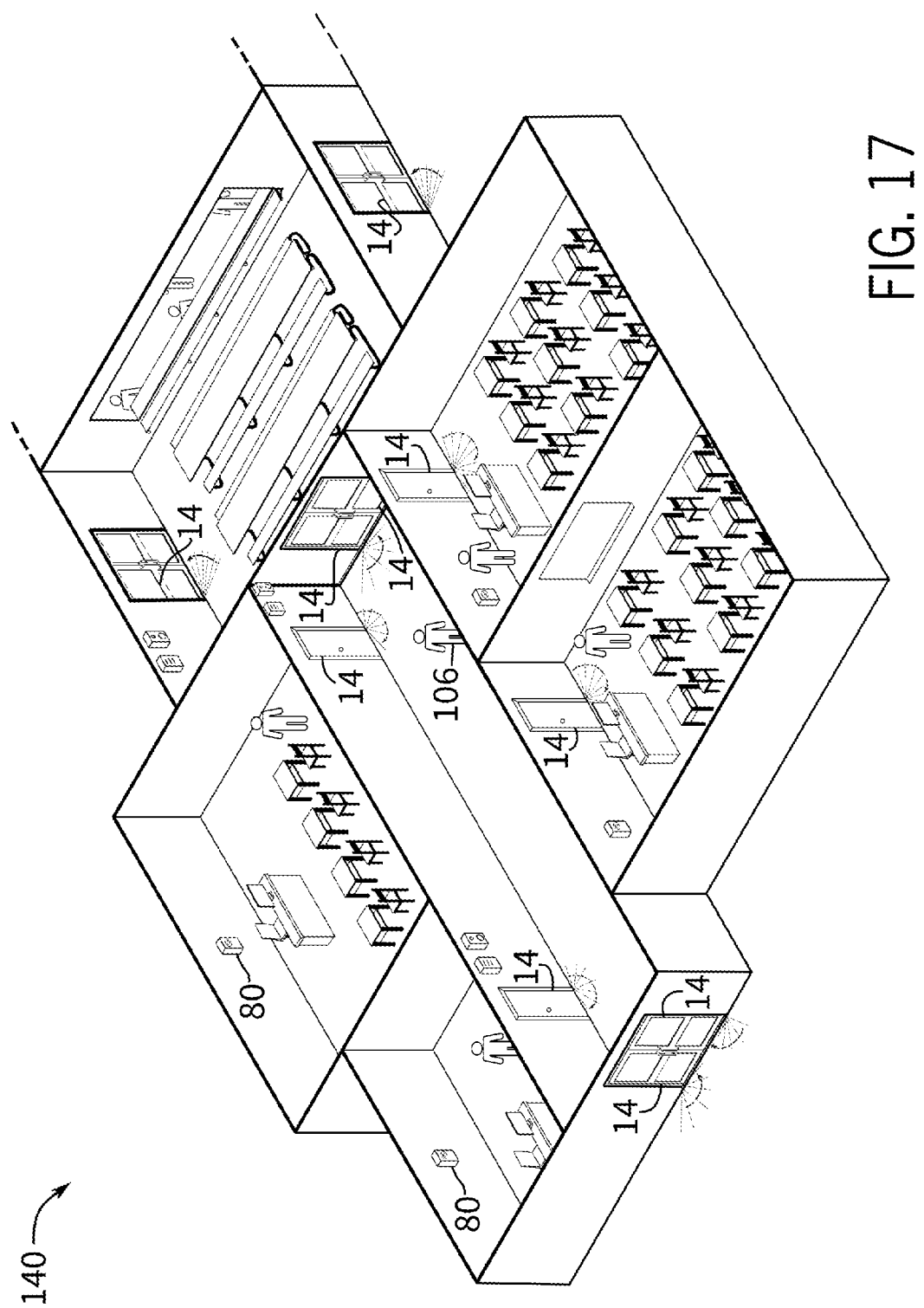

Finally referring, in relation to this peer-to-peer example, to FIG. 17, which conceptually illustrates a fourth peer-to-peer stage 140 in which the EDS remote broadcast device triggers a signal to multiple silent broadcast signal-activated electronic door stops that automatically release to concurrently close all doors of a school during lockdown when an unauthorized intruder enters the school. As shown in this figure, the fourth peer-to-peer stage 140 demonstrates the lockdown procedure being carried out after the alert signal was propagated to all of the silent broadcast signal-activated electronic door stops 100, causing them to concurrently release in order to automatically and concurrently close all of the open doors 14 of the school 104. In this case, the unauthorized intruder 106 remains in the school 106, but is unable to enter classrooms, offices, or the cafeteria. Furthermore, if the unauthorized intruder 106 had been seen outside and nearby the school 104 by one of the authorized school personnel 108a, 108b, 108c, or 108d before entering the school 104, the EDS remote broadcast device 80 in the room of the respective authorized school personnel 108a, 108b, 108c, or 108d could have been activated to trigger the lockdown procedure of nearly immediately closing all the doors 14 of the school 104, including closing all of the exterior doors 14 to prevent the unauthorized intruder 106 from entering the school 104 in the first place.

Now turning to another example, FIGS. 18-21 conceptually illustrate a mesh network configuration of the EDS remote broadcast device shown in four stages in which the EDS remote broadcast device triggers a signal to one or more signal routers and to multiple silent broadcast signal-activated electronic door stops which automatically release to concurrently close all doors of a school during lockdown when an unauthorized intruder enters the school.

Figure 18:
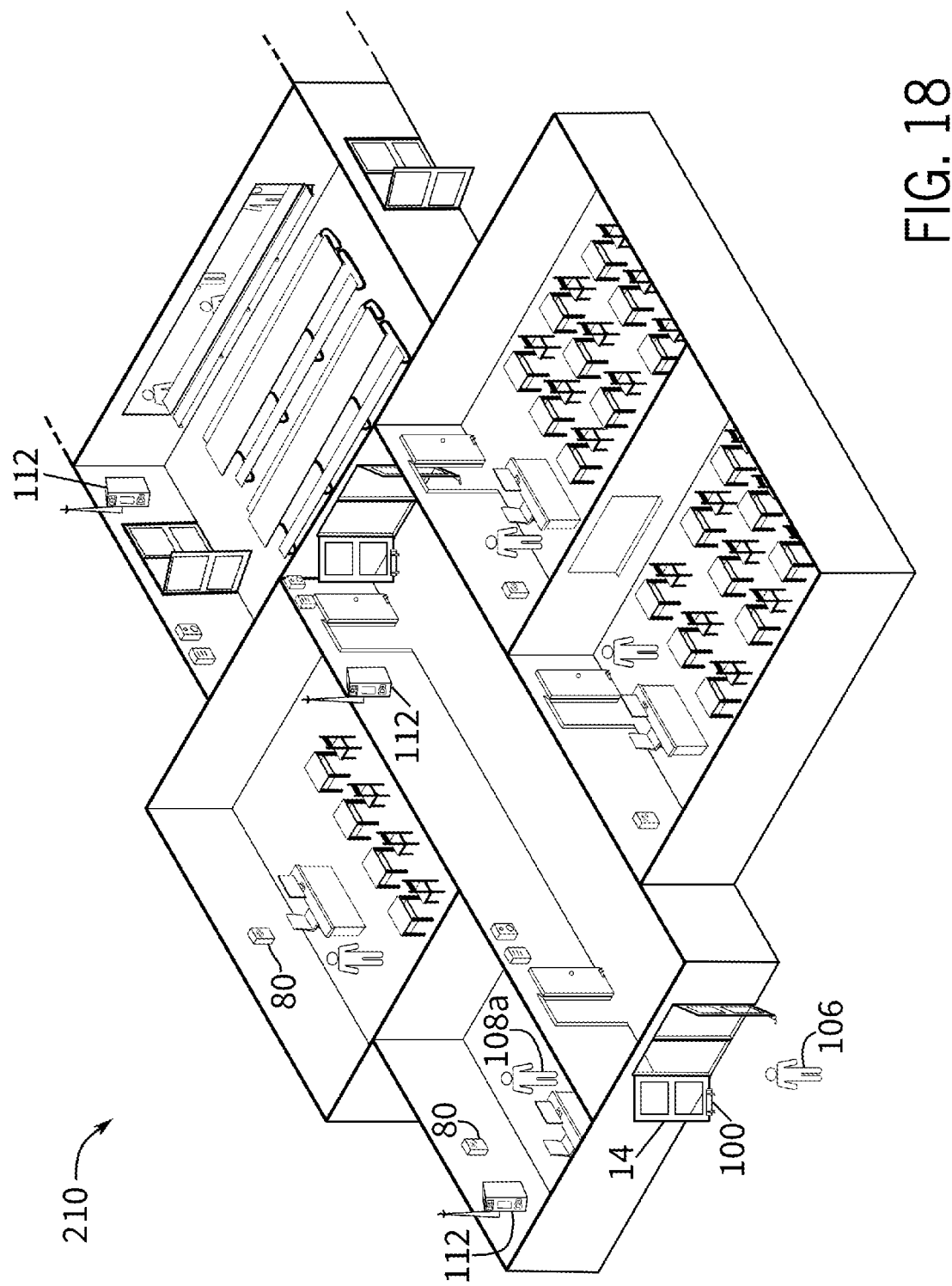
FIGS. 18-21 conceptually illustrate a mesh network configuration of the EDS remote broadcast device shown in four stages in which the EDS remote broadcast device triggers a signal to one or more signal routers and to multiple silent broadcast signal-activated electronic door stops which automatically release to concurrently close all doors of a school during lockdown when an unauthorized intruder enters the school.

Referring first to FIG. 18, which conceptually illustrates a first mesh network stage 210 in which the EDS remote broadcast device triggers a signal to one or more signal routers and to multiple silent broadcast signal-activated electronic door stops which automatically release to concurrently close all doors of a school during lockdown when an unauthorized intruder enters the school. As shown in this figure, the first mesh network stage 210 includes three signal router devices 112 (hereinafter referred to as "signal routers 112", "routers 112", "signal repeaters 112", or "repeaters 112"). In some embodiments, the signal routers 112 allow the personal area network (PAN) to be defined over a larger area. For example, if the school 104 was particularly long or spacious, or included multiple floors, signal routers 112 would allow the PAN to effectively cover the greater area over which wireless RF signals would be transmitted. An example of a signal router that could be deployed is a Zigbee router or Zigbee repeater, or another routing device that adheres to the wireless communication standard specified under IEEE 802.15.4 and is a capable of capturing broadcast signals and re-broadcasting the signals in at least one of three supported wireless RF frequency bands, including 868 MHz, 915 MHz, and 2.4 GHz.

Similar to the first peer-to-peer stage 110 described above by reference to FIG. 14, the first mesh network stage 210 demonstrates the unauthorized intruder 106 outside the school 104 with all doors 14 of the school open and the authorized school personnel 108a in the office with the EDS remote broadcast device 80 mounted on the wall, and a signal router 112 mounted somewhere nearby the EDS remote broadcast device 80.

Figure 19:
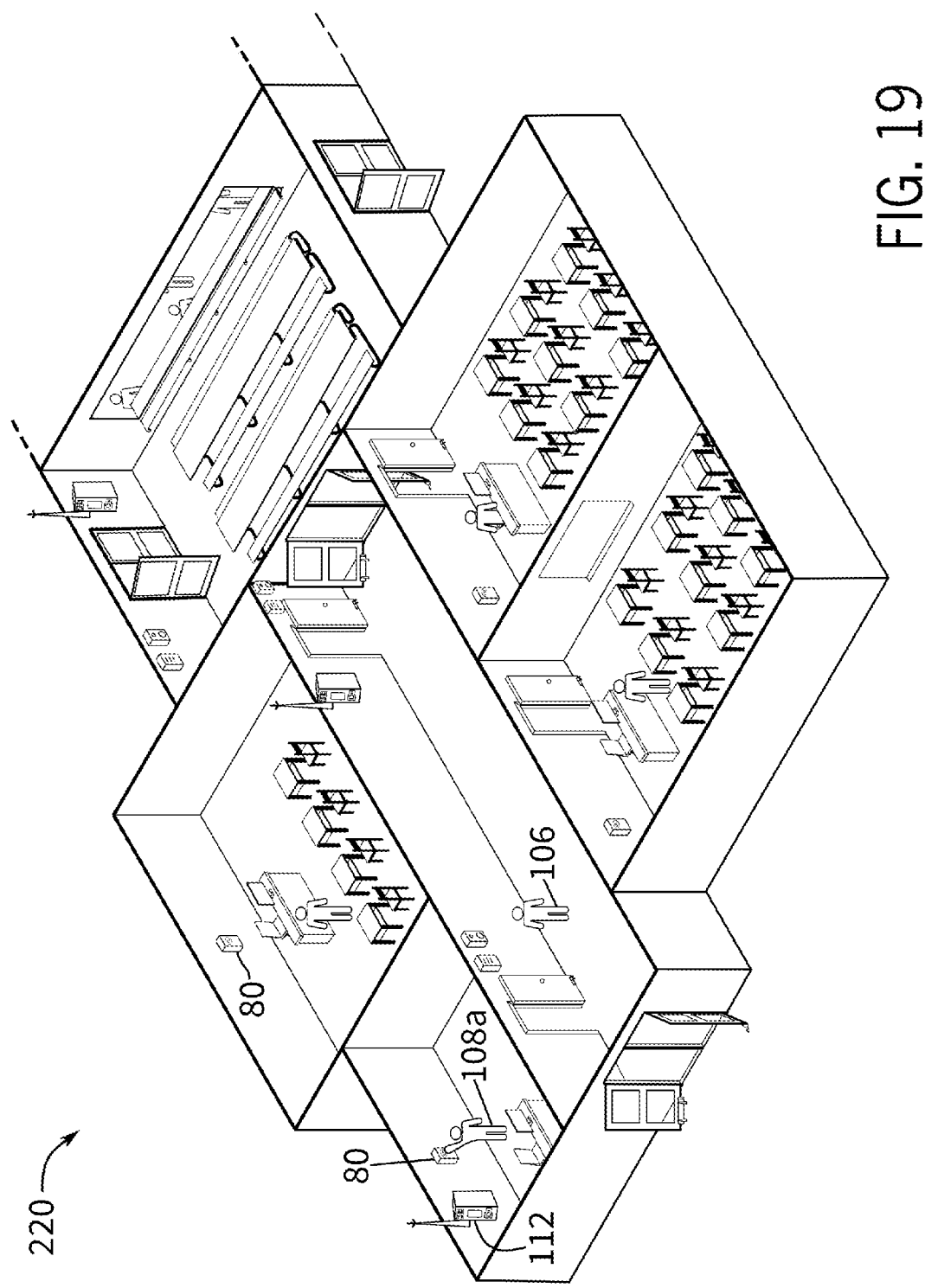

Referring next to FIG. 19, which conceptually illustrates a second mesh network stage 220 in which the EDS remote broadcast device triggers a signal to one or more signal routers and to multiple silent broadcast signal-activated electronic door stops which automatically release to concurrently close all doors of a school during lockdown when an unauthorized intruder enters the school. As shown in this figure, the second mesh network stage 220 demonstrates the authorized school personnel 108a pressing the push button 82 of the EDS remote broadcast device 80 after detecting the dangerous situation brought about by the unauthorized intruder 106 entering into the school 104 through the open doors 14 at the front.

Figure 20:
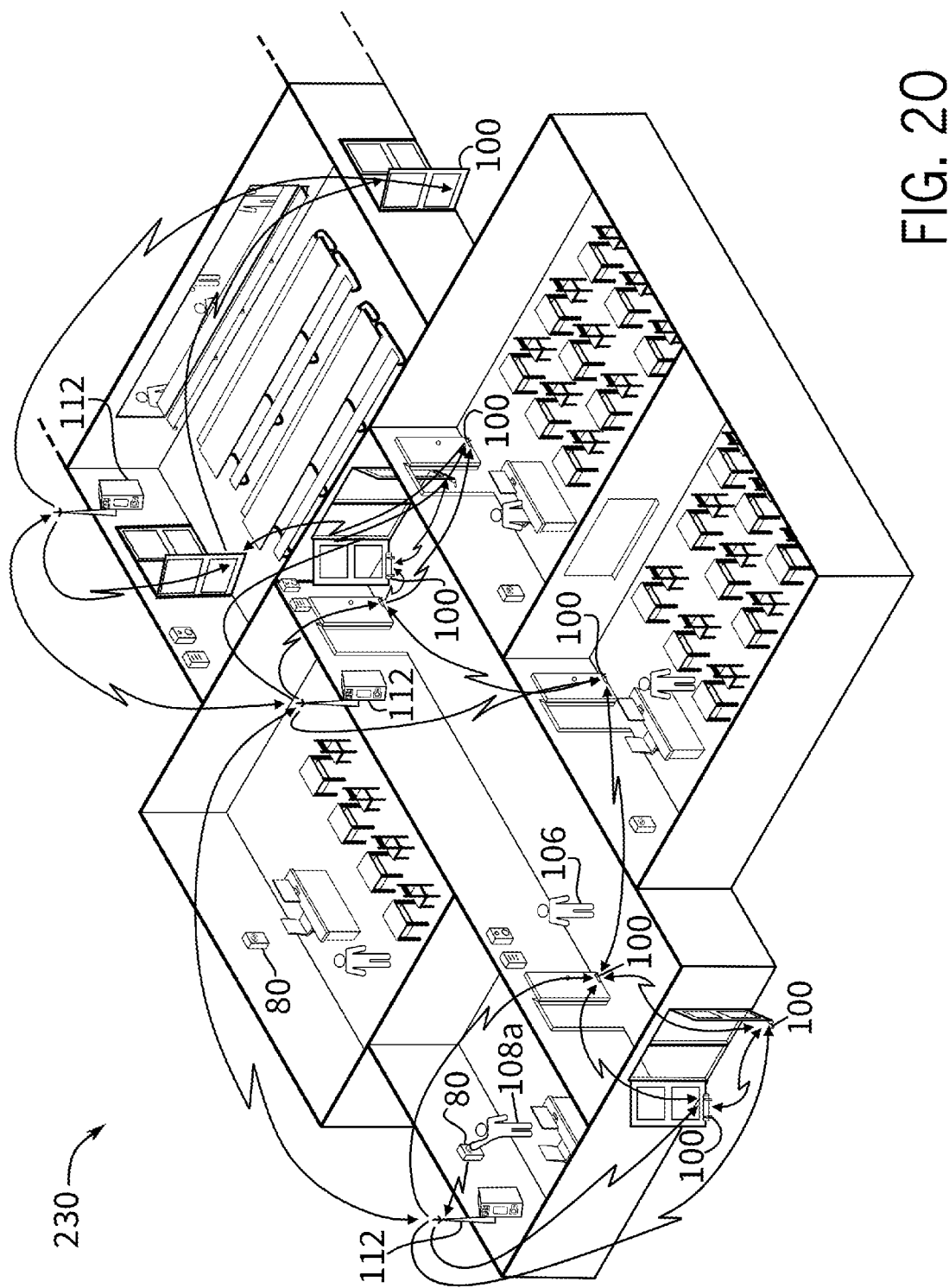

Now referring to FIG. 20, which conceptually illustrates a third mesh network stage 230 in which the EDS remote broadcast device triggers a signal to one or more signal routers and to multiple silent broadcast signal-activated electronic door stops which automatically release to concurrently close all doors of a school during lockdown when an unauthorized intruder enters the school. One of the key features of configuring the personal area network (PAN) defined for an 802.15.4 or Zigbee wireless network is that a mesh network can be set in which fully-functional devices in the PAN broadcast signal and receive signals from another other devices. In some cases, this allows individual devices in the PAN, such as the silent broadcast signal-activated electronic door stops 100 and/or the EDS remote broadcast devices 80 to be spaced sufficiently close so as to render signal routers 112 unnecessary. In a certain amount of cases, even lower powered devices in the PAN or devices which lose power or wireless connectivity, can be supplemented by the wireless RF signal broadcasting of one or more of the other devices that are members of the PAN. Thus, while the mesh network configuration in this example includes signal routers 112, a person of ordinary skill in the art would understand that the wireless communication demonstrated in this figure could apply to personal area networks that do not include any signal router 112 members, so long as there is signal coverage and sufficient redundancy of coverage to cover all devices in the PAN when at full power (all devices) or under-powered (e.g., one or more devices low powered or without power).

Taken in this example, the third mesh network stage 230 demonstrates signal propagation via both signal routers 112 and the silent broadcast signal-activated electronic door stops 100 when the authorized school personnel 108a triggers the EDS remote broadcast device 80 by pressing the push button 82. In this case, the wireless RF transceiver 98 of the EDS remote broadcast device 80 transmits the signal to the nearby signal router 112. The signal router 112 in the room of the authorized school personnel 108a then broadcasts the signal to all PAN member devices in its wireless RF signal transmission range. Thus, at least one other signal router 112 receives the broadcast signal from the signal router 112 in the room of the authorized school personnel 108a, as well as three of the silent broadcast signal-activated electronic door stops 100. At least one of the three silent broadcast signal-activated electronic door stops 100 re-broadcasts the signal to another silent broadcast signal-activated electronic door stop 100 which is across the school hallway and (in this example) out of range of the signal router 112 in the room of the authorized school personnel 108a. The signal router 112 in the school hallway also re-broadcasts the signal to other PAN member devices which are within its own wireless RF signal transmission range, including four of the silent broadcast signal-activated electronic door stops 100 and the last remaining signal router 112 shown in the cafeteria. The cafeteria signal router 112 thereafter re-broadcasts the signal to the remaining silent broadcast signal-activated electronic door stops 100. In this way, the mesh network configuration of the personal area network (PAN) allows the alert signal to be broadcast to all of the devices that are defined as members of the PAN, no matter how large or spacious the overall PAN coverage area may be.

Figure 21:
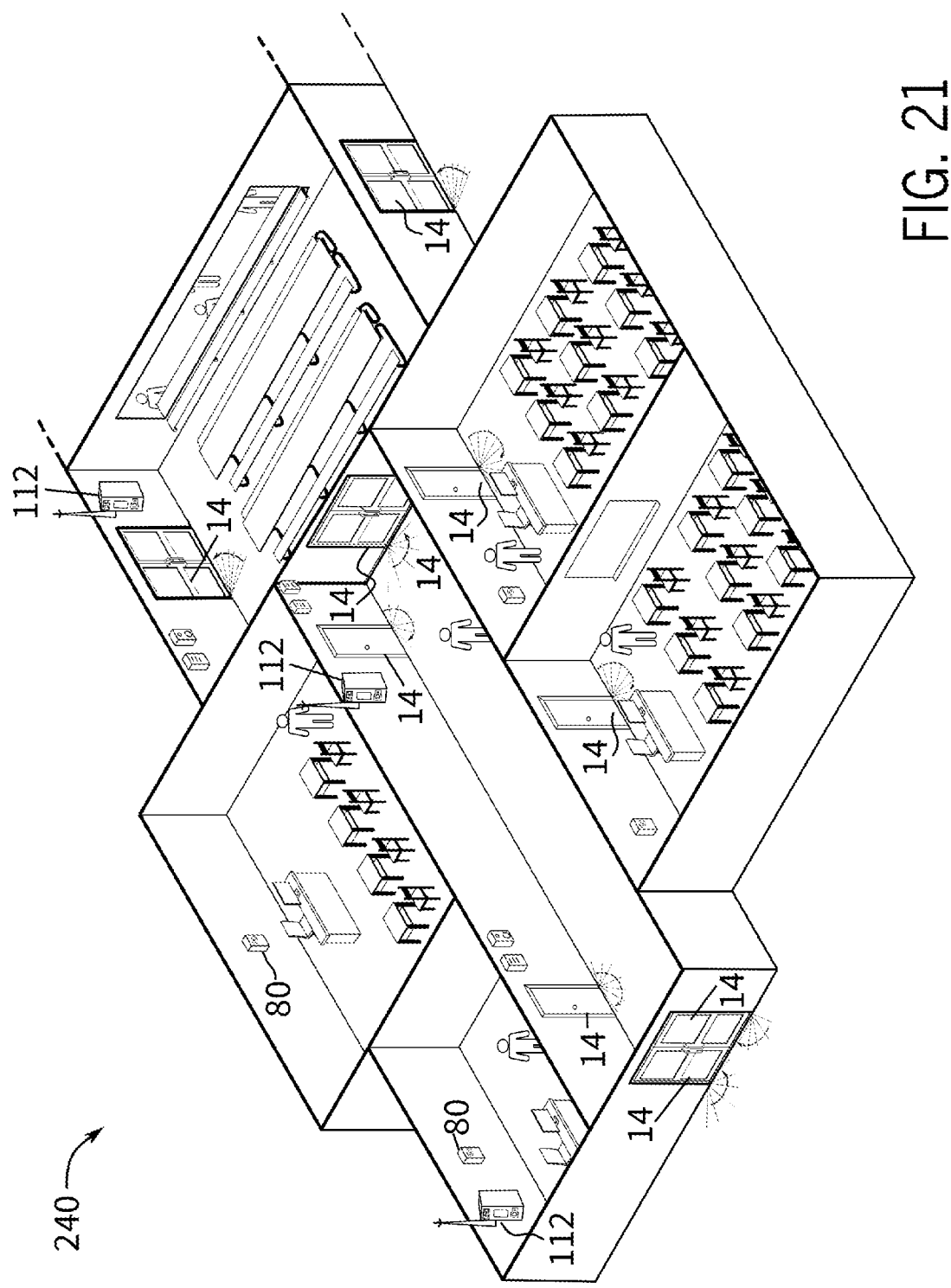

Finally referring, in relation to this mesh network example, to FIG. 21, which conceptually illustrates a fourth mesh network stage 240 in which the EDS remote broadcast device triggers a signal to one or more signal routers and to multiple silent broadcast signal-activated electronic door stops which automatically release to concurrently close all doors of a school during lockdown when an unauthorized intruder enters the school. As shown in this figure, the doors 14 of the school 104 have automatically shut due to the silent broadcast signal-activated electronic door stops 100 all releasing at approximately the same time. This leaves the unauthorized intruder 106 out of the reach of students or school personnel who remain in classrooms and offices with the doors 14 closed in conformity with the lockdown procedures of the school 104.

By way of example, FIGS. 22-25 conceptually illustrate a star network configuration of the EDS remote broadcast device shown in four stages in which the EDS remote broadcast device triggers a signal to a network coordinator router device that passes the signal on other routers and to multiple silent broadcast signal-activated electronic door stops which automatically release to concurrently close all doors of a school during lockdown when an unauthorized intruder enters the school.

Figure 22:
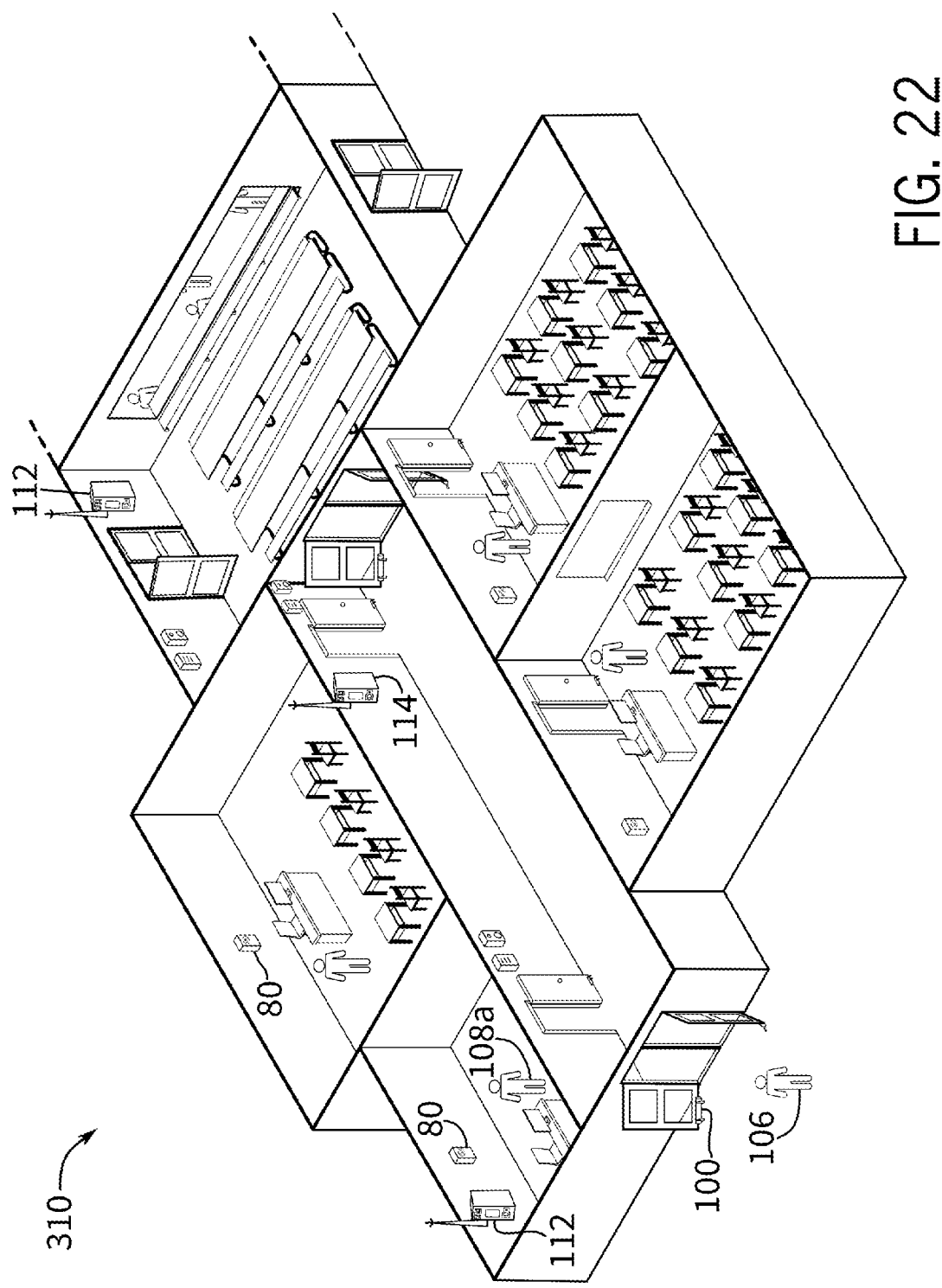
FIGS. 22-25 conceptually illustrate a star network configuration of the EDS remote broadcast device shown in four stages in which the EDS remote broadcast device triggers a signal to a network coordinator router device that passes the signal on other routers and to multiple silent broadcast signal-activated electronic door stops which automatically release to concurrently close all doors of a school during lockdown when an unauthorized intruder enters the school.

Referring first to FIG. 22, which conceptually illustrates a first star network stage 310 in which the EDS remote broadcast device triggers a signal to a network coordinator router device that passes the signal on other routers and to multiple silent broadcast signal-activated electronic door stops which automatically release to concurrently close all doors of a school during lockdown when an unauthorized intruder enters the school. In contrast to the mesh network configuration, described above by reference to FIGS. 18-21, a star network configuration is possible for personal area networks (PAN) that conform to the wireless network standards of IEEE 802.15.4 or Zigbee networks. A star network configuration is demonstrated in this example. Thus, as shown in this figure, one of the signal routers 112 of the mesh network configuration example is now shown as network coordinator router device 114. Although any 802.15.4 or Zigbee network defines a personal area network (PAN) to have a network coordinator device, the mesh network configuration example described above by reference to FIGS. 18-21, and the peer-to-peer configuration described above by reference to FIGS. 14-17, did not include description of such a network coordinator device, in order to focus on the method of signal transmission and propagation when an emergency signal is broadcast by a triggered EDS remote broadcast device 80. However, it should be understood that in defining and configuring the PANs of the mesh network configuration and the peer-to-peer configuration, any one of the PAN member devices can (and would) be defined as the network coordinator device. This would neither limit nor enhance the capabilities of the PAN member device defined as the network coordinator device, but would be required under the IEEE 802.15.4 and Zigbee specifications.

Nevertheless, in the star network configuration example described by reference to FIGS. 22-25, a network coordinator router device 114 is shown in order to demonstrate the method of signal broadcasting that occurs with a star network configuration. Specifically, the network coordinator router device 114 is a central device in a coverage area the approximately in the middle of the school 104.

Figure 23:
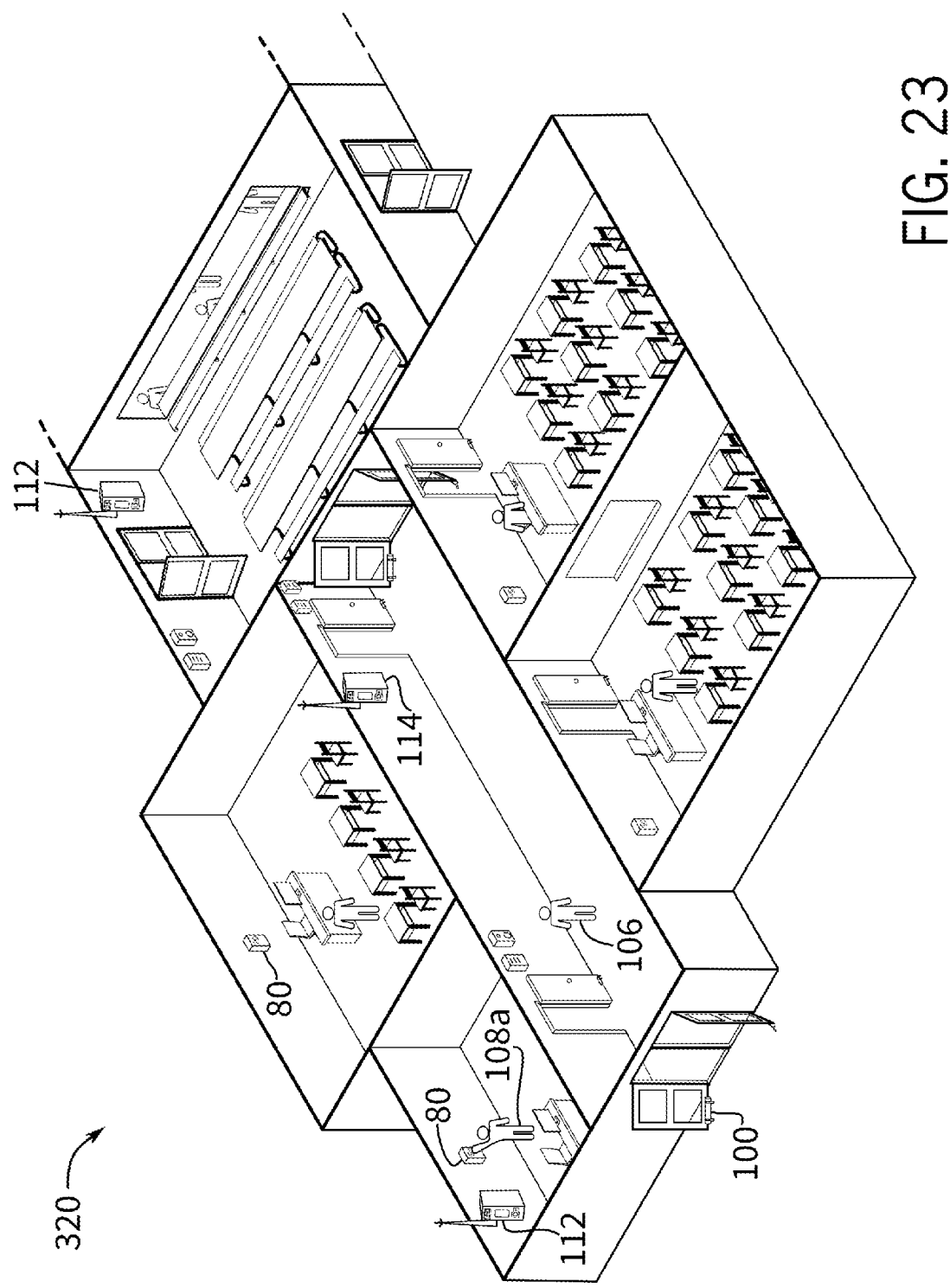

Referring next to FIG. 23, which conceptually illustrates a second star network stage 320 in which the EDS remote broadcast device triggers a signal to a network coordinator router device that passes the signal on other routers and to multiple silent broadcast signal-activated electronic door stops which automatically release to concurrently close all doors of a school during lockdown when an unauthorized intruder enters the school. As shown in this figure, the second star network stage 320 demonstrates the authorized school personnel 108a triggering the emergency alert signal by depressing the push button 82 of the EDS remote broadcast device 80 in the office room when the unauthorized intruder 106 has entered the school 104 and is walking through the hallway of the school 104.

Figure 24:
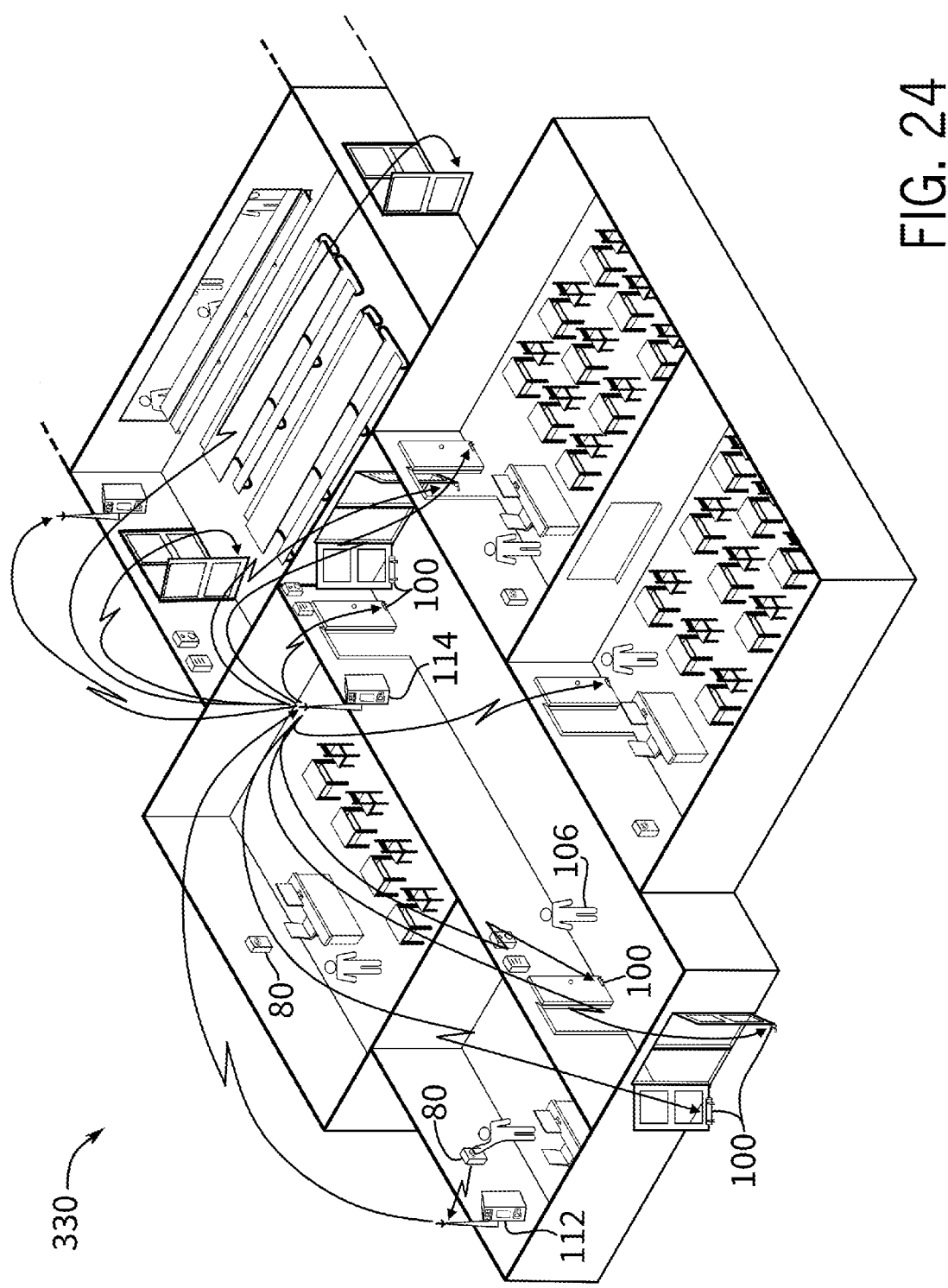

Now referring to FIG. 24, which conceptually illustrates a third star network stage 330 in which the EDS remote broadcast device triggers a signal to a network coordinator router device that passes the signal on other routers and to multiple silent broadcast signal-activated electronic door stops which automatically release to concurrently close all doors of a school during lockdown when an unauthorized intruder enters the school. Thus, the third star network stage 330 demonstrates signal propagation from the EDS remote broadcast device 80 in the office room to the nearby signal router 112 in the office room. The nearby signal router 112 in the office room then transmits the signal to the network coordinator router device 114, which acts as a central hub device in the star network configuration. In other words, all of the other PAN member devices communicate to and from the network coordinate router device 114. Thus, the network coordinator router device 114 re-broadcasts the emergency signal to all of the PAN member devices over the entire coverage area of the PAN in the school 104. As in all the examples described by reference to FIGS. 14-25 (and those described below, by reference to FIGS. 26-29), the signal broadcast to and from PAN member devices is undetectable to the unauthorized intruder 106 or to any human. Thus, the unauthorized intruder 106 and the remaining authorized school personnel 108b, 108c, and 108d may not have any awareness that lockdown procedure has been triggered by the authorized school personnel 108a pressing the push button 82 on the EDS remote broadcast device 80.

Figure 25:
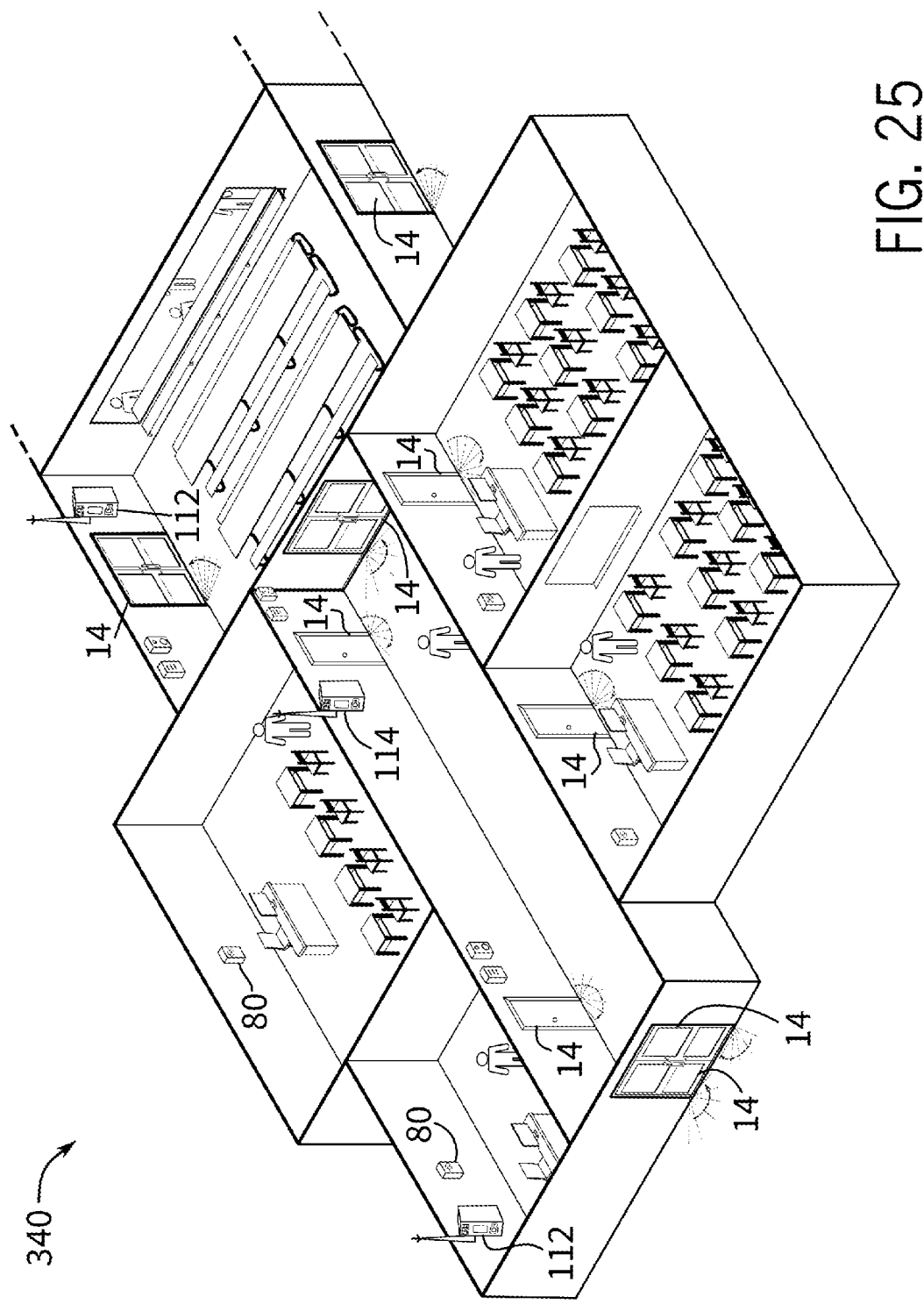

Finally referring, in relation to this star network example, to FIG. 25, which conceptually illustrates a fourth star network stage 340 in which the EDS remote broadcast device triggers a signal to a network coordinator router device that passes the signal on other routers and to multiple silent broadcast signal-activated electronic door stops which automatically release to concurrently close all doors of a school during lockdown when an unauthorized intruder enters the school. As shown in this figure, the fourth star network stage 340 demonstrates the automatic closing of all the doors 14 of the school 104 by the automatic and concurrent releasing of the silent broadcast signal-activated electronic door stops 100 defined as members of this star network PAN.

Now turning to an example of an alternative EDS remote broadcast device, FIGS. 26-29 conceptually illustrate four stages of an unmounted battery-powered mobile EDS remote broadcast device being activated by a teacher on a desk to automatically release silent broadcast signal-activated electronic door stops at all doors in a nearby hallway of a school when an intruder is detected in the hallway.

Figure 26:
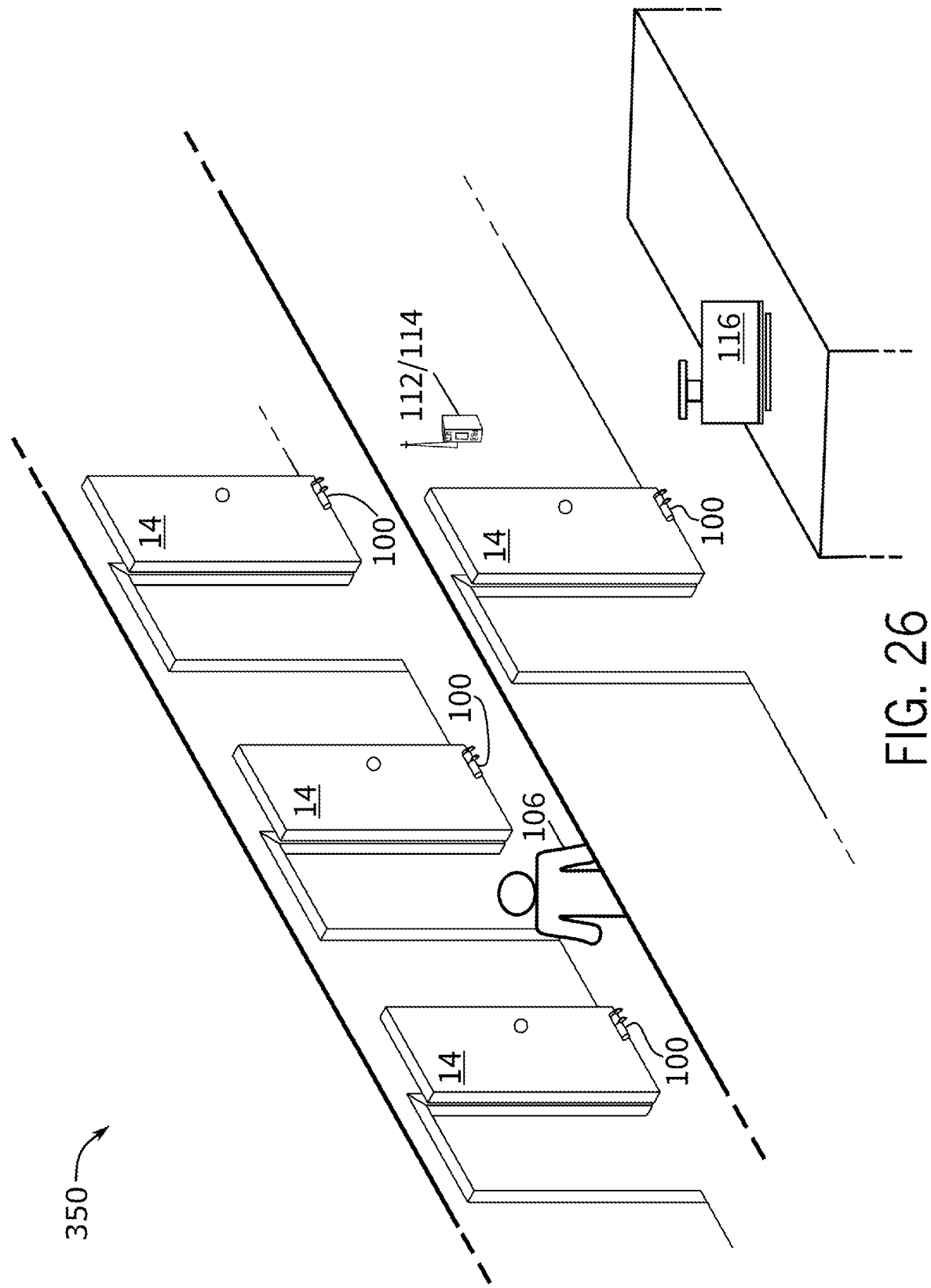
FIGS. 26-29 conceptually illustrate an unmounted battery-powered mobile EDS remote broadcast device in some embodiments activated by a teacher on a desk to automatically release electronic door stops at all doors of a school when an intruder is detected entering the school.

First turning to FIG. 26, which conceptually illustrates a first mobile EDS remote broadcast device stage 350. As shown in this figure, an unmounted battery-powered mobile EDS remote broadcast device 116 is freely disposed on a desk of a room which includes an open door 14 that leads to a hallway in which several other rooms have open doors 14, and all of the doors 14 are propped open by silent broadcast signal-activated electronic door stops 100. An unauthorized intruder 106 is walking through the hallway. A signal router 112/network coordinator router device 114 is mounted to an inner wall in the room of the unmounted battery-powered mobile EDS remote broadcast device 116. In this example, the hallway may be a hallway in a school which has lockdown procedures for dangerous situations and requires that all doors in the school be closed when a dangerous or emergency situation arises.

Similar to the wall-mounted EDS remote broadcast device 80 described above by reference to FIGS. 9-12 and 14-25, the unmounted battery-powered mobile EDS remote broadcast device 116 demonstrated in the first mobile EDS remote broadcast device stage 350 is inactive until a human operator, such as a teacher or another authorized school personnel presses the push button to trigger an alert signal and start lockdown procedures. However, the unmounted battery-powered mobile EDS remote broadcast device 116 demonstrated in the first mobile EDS remote broadcast device stage 350 may include an internal battery power source (not shown) instead of a cord and plug that allows the EDS remote broadcast device 80 to be powered. Battery power may include a battery stack with two D-cell batteries or may include a lithium battery or other type of battery that provides direct DC power to the unmounted battery-powered mobile EDS remote broadcast device 116. In this way, the transformer 96 which is included in the EDS remote broadcast device 116 is obviated. However, in some versions of the unmounted battery-powered mobile EDS remote broadcast device 116, both battery power and cord/plug power are provided. When both battery power and cord/plug power are included as power sources of the unmounted battery-powered mobile EDS remote broadcast device 116, the end-user of the unmounted battery-powered mobile EDS remote broadcast device 116 is ensured that an emergency signal can be broadcast, even when power to the school is cut out or lost. Furthermore, providing a battery power source allows the unmounted battery-powered mobile EDS remote broadcast device 116 to be a mobile device which can be moved from one location to another location and still broadcast an alert signal, so long as the location remains within a wireless RF signal transmission range to reach the signal router 112/network coordinator router device 114 or other devices that are members of the personal area network (PAN) of which the unmounted battery-powered mobile EDS remote broadcast device 116 is a member.

Figure 27:
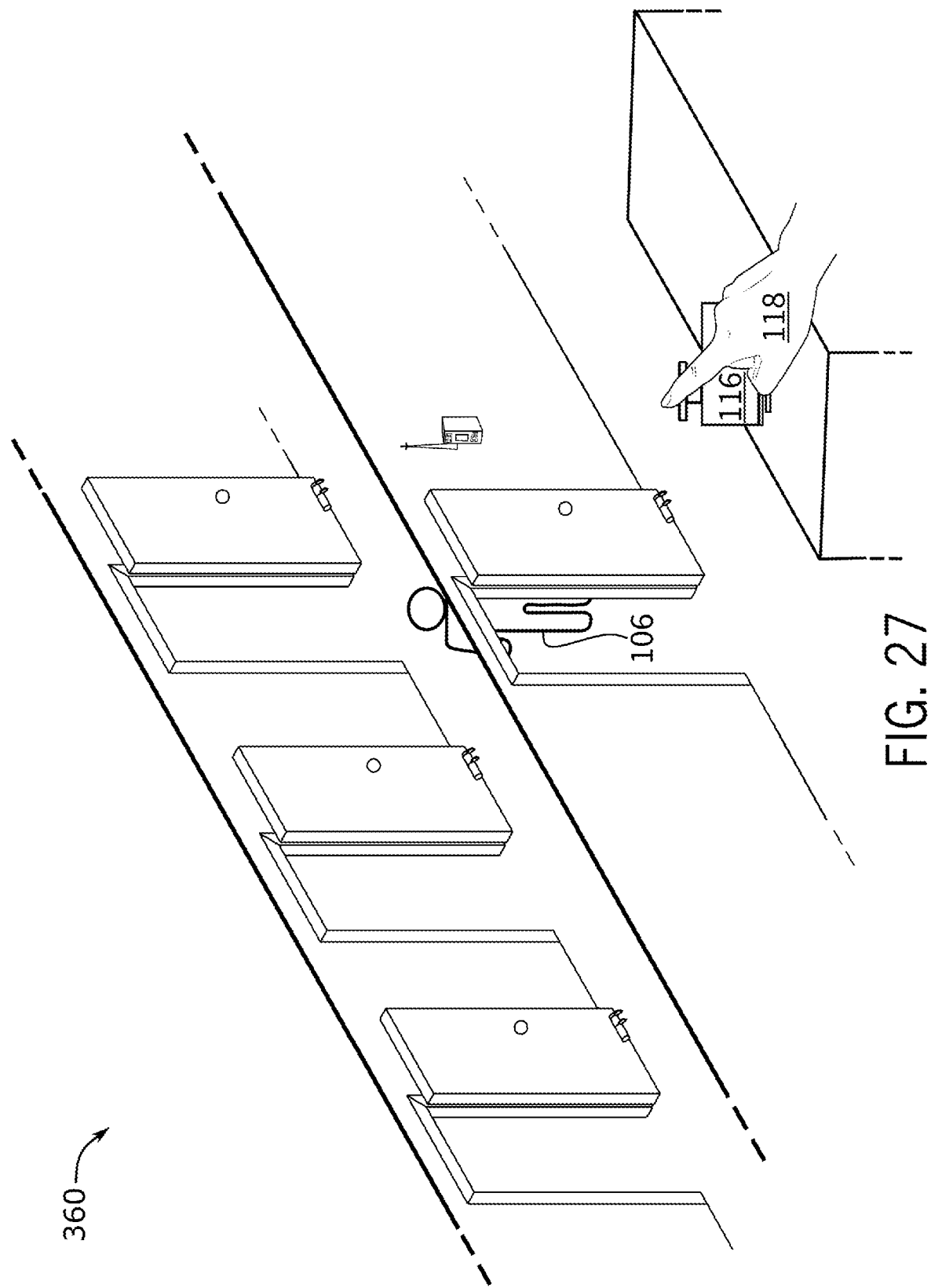

By way of example, FIG. 27 conceptually illustrates a second mobile EDS remote broadcast device stage 360. As demonstrated in the second mobile EDS remote broadcast device stage 360, the unauthorized intruder 106 has continued walking through the hallway, passing the open door 14 of the room in which the unmounted battery-powered mobile EDS remote broadcast device 116 resides. A teacher 118 at the desk becomes aware of the unauthorized intruder 106, and in accordance with rules for handling dangerous situations, presses the unmounted battery-powered mobile EDS remote broadcast device 116 to trigger an emergency broadcast signal that automatically causes all the doors 14 to close. The emergency broadcast signal is silent to any human, so the unauthorized intruder 106 is not alerted to the start of the lockdown process about to ensue.

Figure 28:
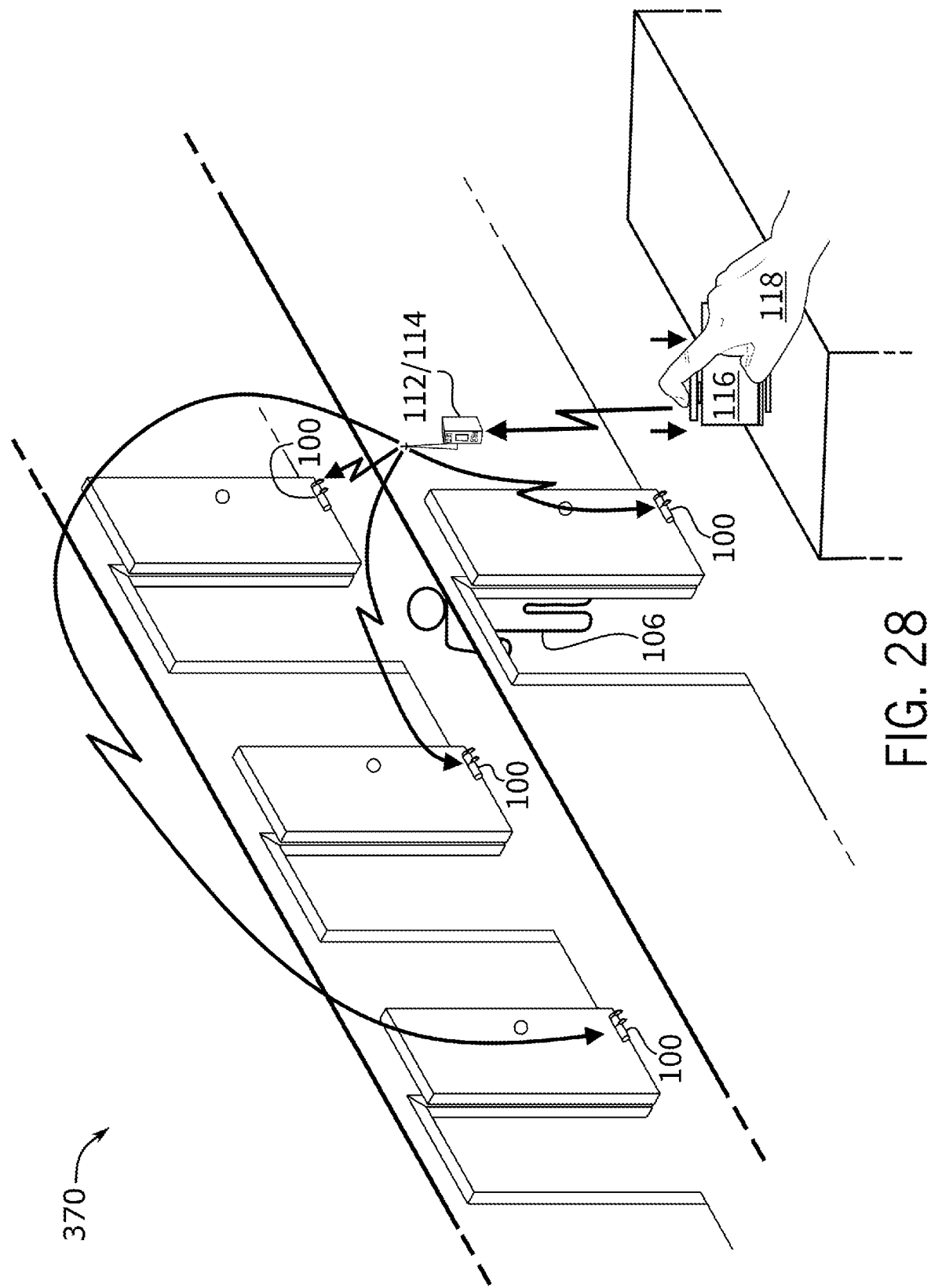

Now turning to another view, FIG. 28 conceptually illustrates a third mobile EDS remote broadcast device stage 370. As shown in the third mobile EDS remote broadcast device stage 370, the teacher 118 has pressed the push button of the unmounted battery-powered mobile EDS remote broadcast device 116 down, which triggers an emergency alert signal to be transmitted to the signal router 112/network coordinator router device 114. After receiving the emergency alert signal, the signal router 112/network coordinator router device 114 broadcasts the signal to all the other PAN member devices, namely, all of the silent broadcast signal-activated electronic door stops 100 which are presently propping open all of the doors 14.

Figure 29:
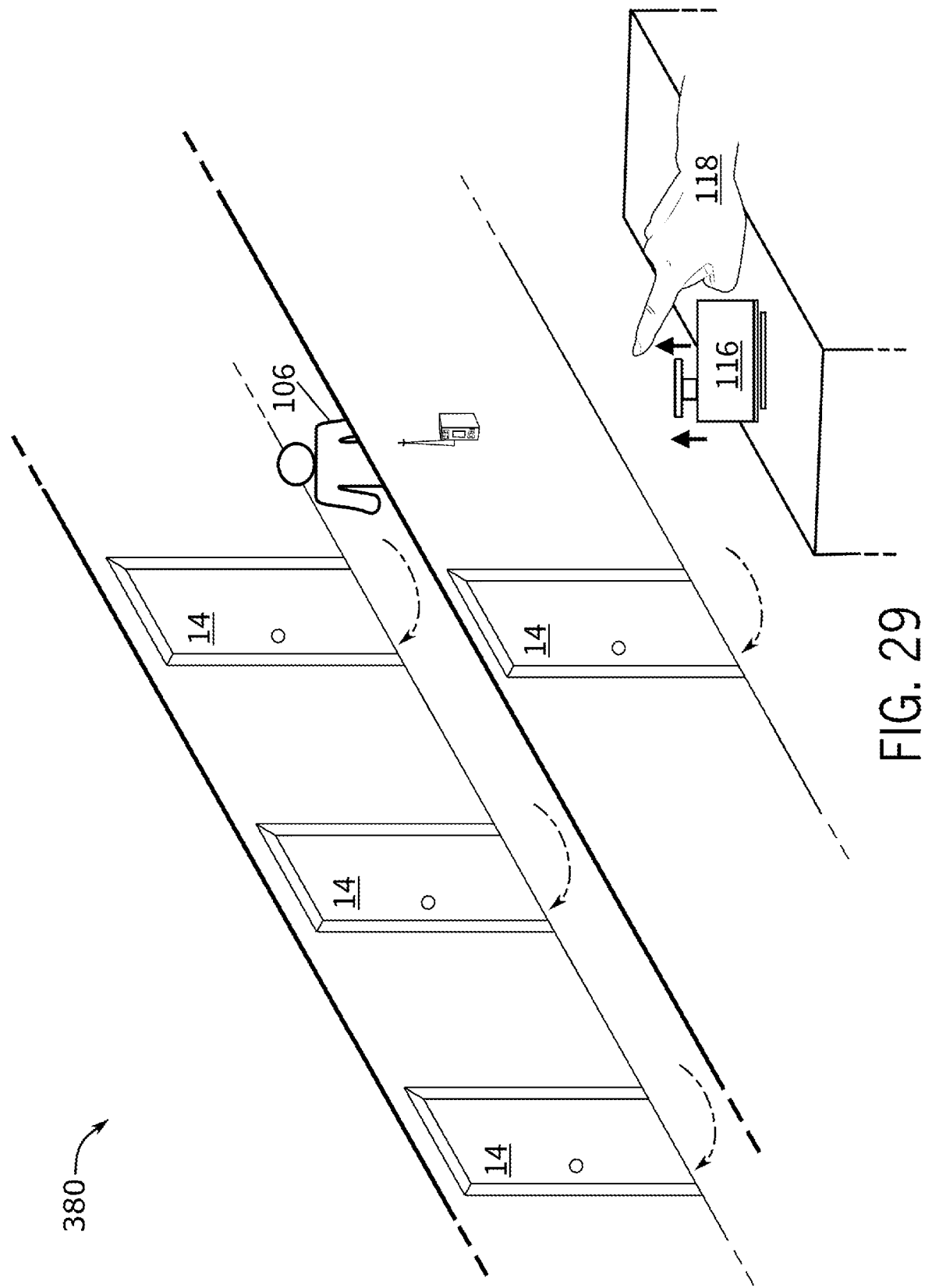

As the teacher 118 releases the push button of the unmounted battery-powered mobile EDS remote broadcast device 116, the silent broadcast signal-activated electronic door stops 100 automatically release to close the doors 14, which is shown next by reference to FIG. 29, which conceptually illustrates a fourth mobile EDS remote broadcast device stage 380. As shown in the fourth mobile EDS remote broadcast device stage 380, all the doors 14 concurrently close and the unauthorized intruder 106 remains out in the hallway, with the teacher 118 in the room and all other students and school personnel safe in their respective rooms.

The unmounted battery-powered mobile EDS remote broadcast device 116 described above by reference to FIGS. 26-29 is exemplary and not to be construed as limiting of all embodiments of the unmounted mobile EDS remote broadcast device. For example, the unmounted mobile EDS remote broadcast device can take a form of a handheld mobile device that is powered by lithium battery power. Another variation would be a desktop-type device, such as the unmounted battery-powered mobile EDS remote broadcast device 116 described above by reference to FIGS. 26-29, but powered by cord and plug, such as the EDS remote broadcast device 80 described above by reference to FIGS. 9-12. Furthermore, a person skilled in the relevant art would understand there to be other types of forms which can embody other EDS remote broadcast devices and which can provide the functional aspects described herein.

IV. Visual Lockdown Notification and Alert Device

As noted above, in some lockdown situations there may be people who need to be visually informed (due to hearing issues or in order to carry out a silent mode lockdown). The visual lockdown notification and alert device described in this section provides the needed solution to these concerns.

In some embodiments, the visual lockdown notification and alert device that provides audibly silent visual notification of lockdown is activated in silent mode when a human operator presses a silent visual alert broadcast button on the visual lockdown notification and alert device. In some embodiments, the visual lockdown notification and alert device that provides audibly silent visual notification of lockdown is activated in silent mode when a human operator presses a button on an electronic door stop remote broadcast device to broadcast a wireless data signal to multiple silent broadcast signal-activated electronic door stops to automatically and concurrently close any doors propped open by the silent broadcast signal-activated electronic door stops. Upon activation by human operator, the visual lockdown notification and alert device of some embodiments flashes the LED strobe light and transmits signals to other visual lockdown notification and alert device.

In some embodiments, the visual lockdown notification and alert device that provides sound-activated visual notification of lockdown is activated upon audible detection of a particular sound that closes a door propped open by a sound-activated remote release electronic door stop. Upon sound-based activation, the visual lockdown notification and alert device of some embodiments flashes the LED strobe light and transmits signals to other visual lockdown notification and alert device.

Figure 30:
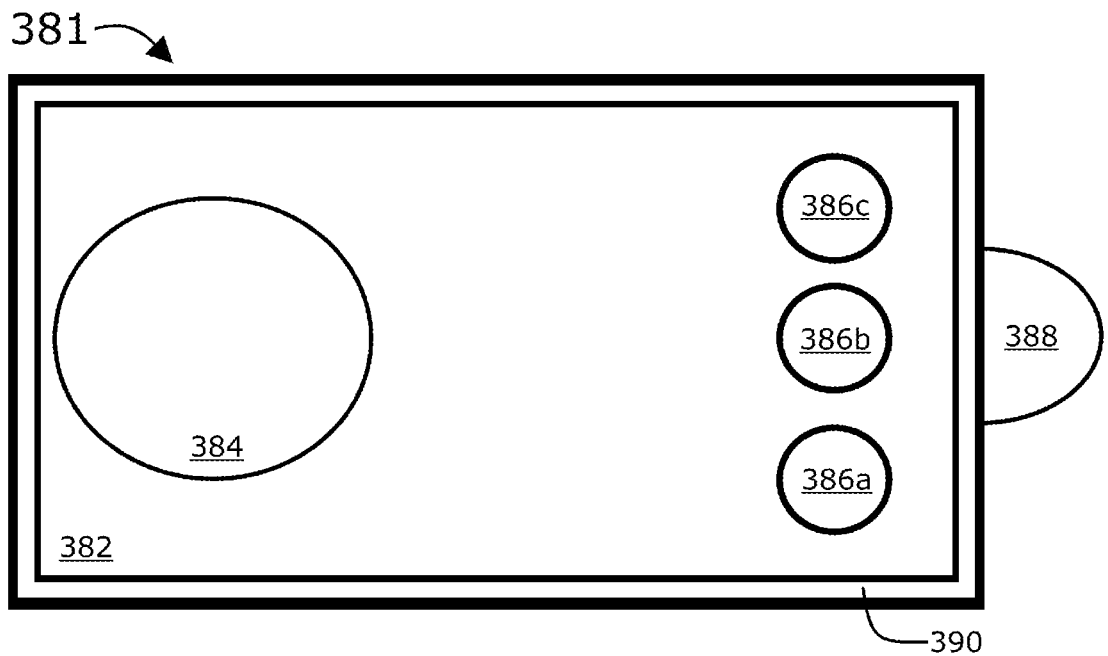
FIG. 30 conceptually illustrates a plan view of a visual lockdown notification and alert device in some embodiments.

By way of example, FIG. 30 conceptually illustrates a plan view of a visual lockdown notification and alert device 381. As shown in this figure, the visual lockdown notification and alert device 381 is viewed externally and includes an assembly cover 382, a microphone grill 384 on the assembly cover 382, three micro-buttons 386a, 386b, and 386c, an LED strobe globe light 388, and a snap-on base mounting plate 390 that fastens to a wall and secures transceiver body with snap-in tabs. The three micro-buttons 386a, 386b, and 386c may appear in three different colors. The three micro-buttons 386a, 386b, and 386c trigger actions of the visual lockdown notification and alert device 381 when pressed by a person. For example, a first micro-button 386a may be colored red, a second micro-button 386b may be colored green, and a third micro-button 386c may be colored blue, which provide visual differentiation of different functions that can be activated by pressing. Any color configuration can be utilized for the three micro-buttons 386a, 386b, and 386c. In some embodiments, when a person presses the first (red) micro-button 386a, the visual lockdown notification and alert device 381 closes (or retracts) an electronic door stop (EDS) propping open a nearby door. In some embodiments, when a person presses the second (green) micro-button 386b, the visual lockdown notification and alert device 381 extends an electronic door stop (EDS) to prop open a nearby door by its extension. In some embodiments, when a person presses the third (blue) micro-button 386c, the visual lockdown notification and alert device 381 initiates an emergency broadcast signal to all other devices, which triggers the LED strobe globe light 388 to start flashing as an emergency broadcast-activated visual lockdown notification and alert (e.g., flashing as a silent mode visual lockdown notification and alert).

Figure 31:
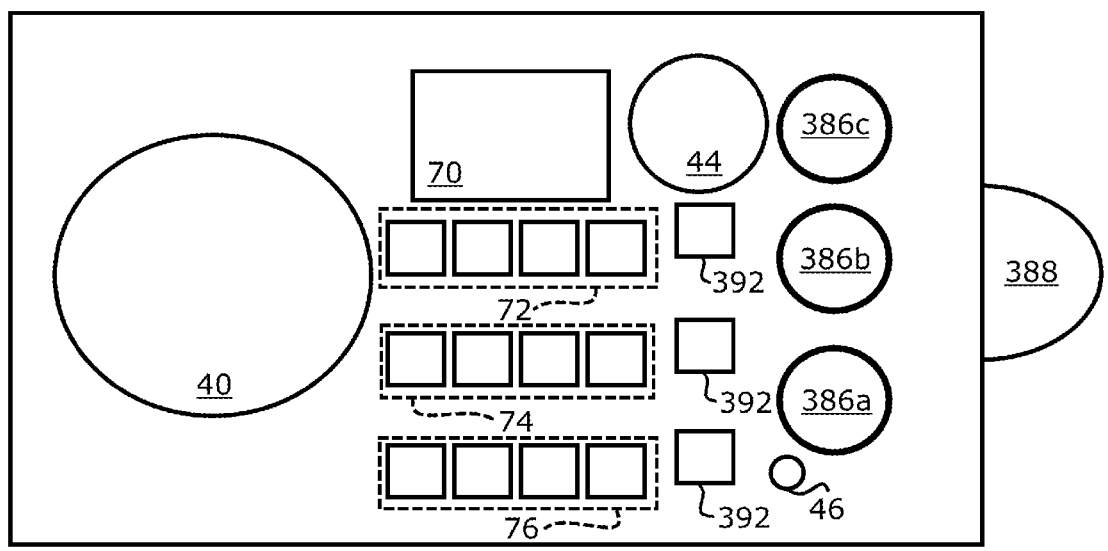
FIG. 31 conceptually illustrates a plan view of a printed circuit board of the visual lockdown notification and alert device in some embodiments when an outer housing of the visual lockdown notification and alert device is removed.

Turning to another example, FIG. 31 conceptually illustrates a plan view of a printed circuit board (PCB) of the visual lockdown notification and alert device 381 when an outer housing (the assembly cover 382) of the visual lockdown notification and alert device 381 is removed. As shown in this figure, the PCB of the visual lockdown notification and alert device 381 includes a plurality of components that a described above by reference to FIG. 8, and some additional components that are included in the visual lockdown notification and alert device 381. Specifically, this figure shows the pick-up microphone 40, the lithium battery cell 44, the RGB LED status indicator 46, the micro-processor unit 70, the first transistor bank 72, the second transistor bank 74, and the third transistor bank 76. In addition, this figure shows the first (red) micro-button 386a, the second (green) micro-button 386b, the third (blue) micro-button 386c, the LED strobe globe light 388, and three circuit relays 392 which are active circuit devices for each of the three micro-buttons 386a, 386b, and 386c.

Figure 32:
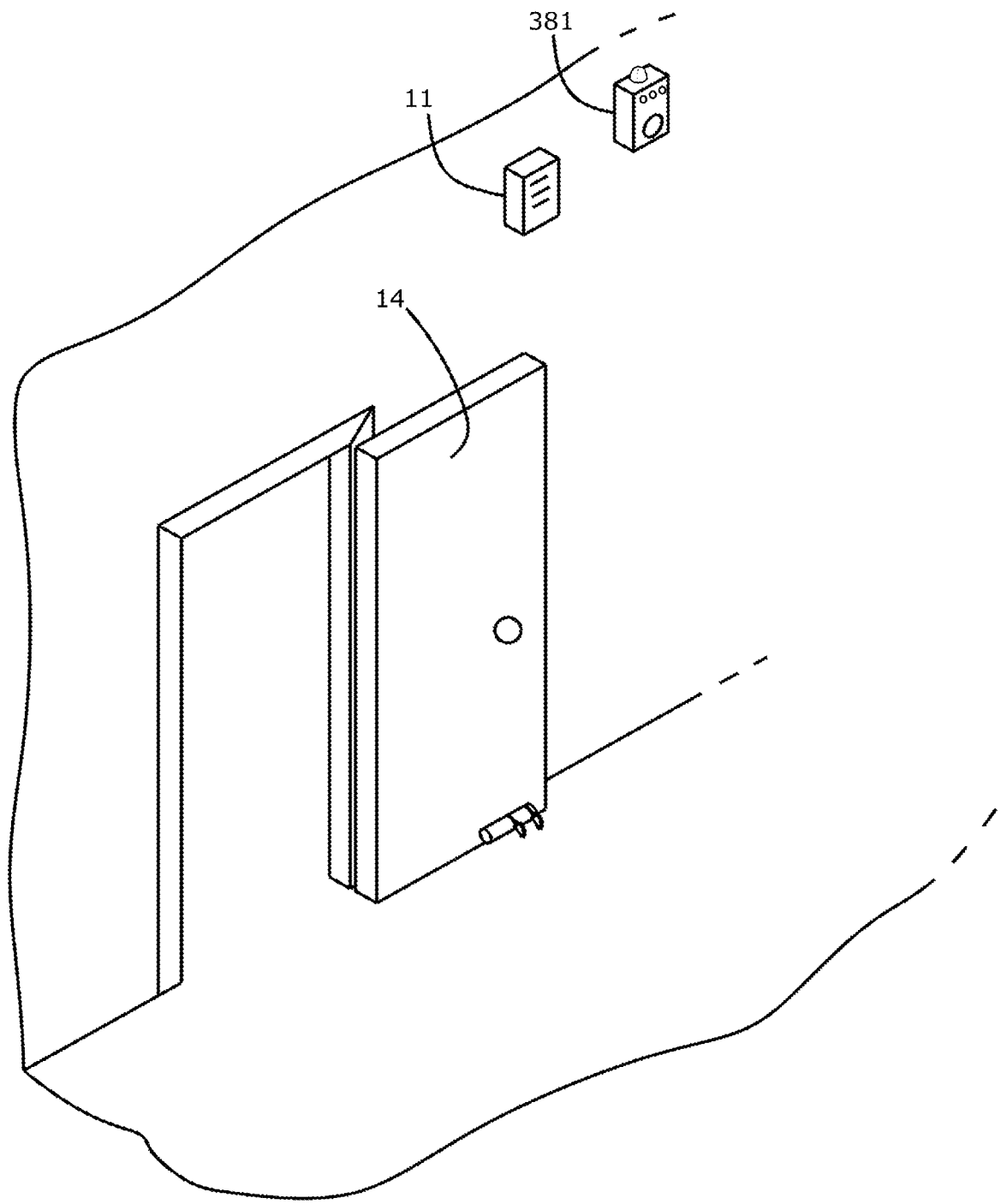
FIG. 32 conceptually illustrates the visual lockdown notification and alert device as a wall-mounted device that is mounted to a wall of a classroom in some embodiments.
Figure 33:
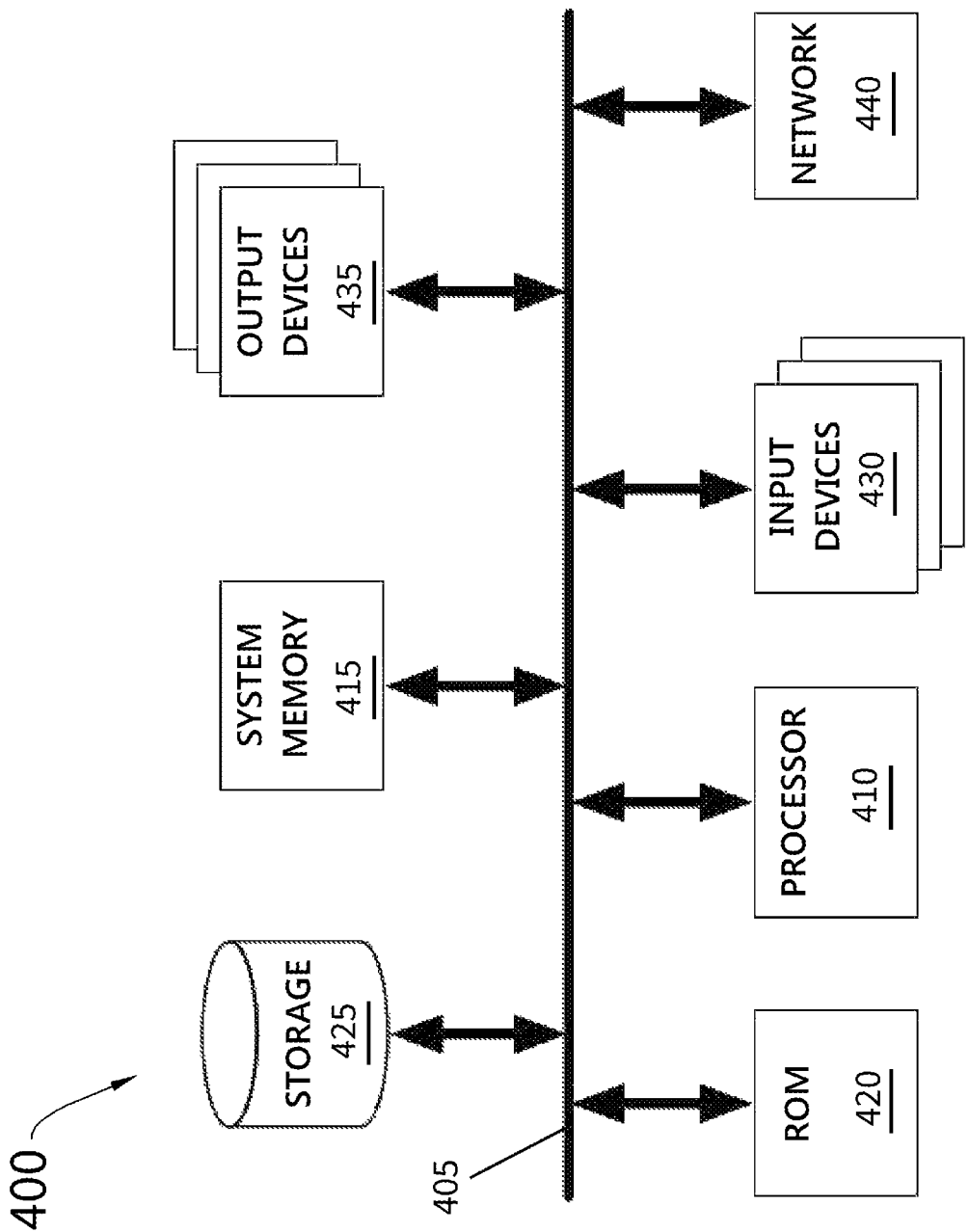
FIG. 33 conceptually illustrates an electronic system with which some embodiments of the invention are implemented.

Now referring to another example of the visual lockdown notification and alert device 381 deployed, FIG. 32 conceptually illustrates the visual lockdown notification and alert device 381 as a wall-mounted device that is mounted to a wall of a classroom in some embodiments. As shown in this figure, the visual lockdown notification and alert device 381 is mounted along the wall nearby the emergency alarm 11 and the (propped open) door 14. In this wall-mounting configuration, the visual lockdown notification and alert device 381 is easy to access by a teacher or administrator, and easy for students, teachers, administrators, and others to see as the LED strobe globe light 388 flashes the visual lockdown notification and alert (with or without audible alarm being sounded).

In some embodiments, a plurality of visual lockdown notification and alert devices are deployed throughout a building and are triggered to flash visual lockdown notifications and alerts a nearby electronic door stop (EDS) device, an EDS remote broadcast device, or by wireless signal over a personal area network (PAN) or other network type. For example, each visual lockdown notification and alert device in the plurality of visual lockdown notification and alert devices can be configured as a device of a PAN, in any configuration such as those described above by reference to FIGS. 14-25, and also by wireless signal from an EDS remote broadcast device, such as an unmounted battery-powered mobile EDS remote broadcast device being activated by a teacher at a desk to automatically flash visual lockdown notifications and alerts and also release silent broadcast signal-activated electronic door stops at all doors in a nearby hallway of a school when an intruder is detected in the hallway.

V. Electronic System

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

FIG. 30 conceptually illustrates an electronic system 400 with which some embodiments of the invention are implemented. The electronic system 400 may be an embedded programmable CPU, micro-processor, or micro-controller, and may relate directly or indirectly to additional computing devices used in configuring and setting operational modes of any or all of the sound-activated remote release electronic door stop, the silent broadcast signal-activated electronic door stop, and the electronic door stop remote broadcast device. Such additional computing devices include, without limitation, computers (desktop, server, and/or laptop), tablet computing devices, smartphone mobile devices, or any other sorts of electronic devices which may be used to configure any or all of the devices or to receive notifications of lockdown protocols being carried out during emergencies in schools, offices, or any other building or facility that may intend to benefit from the functions described herein by deployment of any or all of the devices. Furthermore, an electronic system 400, whether an embedded electronic system or not, includes various types of computer readable media and interfaces for various other types of computer readable media. Electronic system 400 may include, without limitation, a bus 405, processing unit(s) 410, a system memory 415, a read-only 420, a permanent storage device 425, input devices 430, output devices 435, and a network 440 (such as a personal area network that is configured according to the 802.15.4 specification and/or by Zigbee specification).

The bus 405 collectively represents all system, peripheral, and chipset buses that communicatively connect the numerous internal devices of the electronic system 400. For instance, the bus 405 communicatively connects the processing unit(s) 410 with the read-only 420, the system memory 415, and the permanent storage device 425.

From these various memory units, the processing unit(s) 410 retrieves instructions to execute and data to process in order to execute the processes of the invention. The processing unit(s) may be a single processor or a multi-core processor in different embodiments. The processing unit(s) may also be programmable CPU or micro-processors.

The read-only-memory (ROM) 420 stores static data and instructions that are needed by the processing unit(s) 410 and other modules of the electronic system. The permanent storage device 425, on the other hand, is a read-and-write memory device. This device is a non-volatile memory unit that stores instructions and data even when the electronic system 400 is off. Some embodiments of the invention use a mass-storage device (such as a magnetic or optical disk and its corresponding disk drive) as the permanent storage device 425.

Other embodiments use a removable storage device (such as a flash drive) as the permanent storage device 425. Like the permanent storage device 425, the system memory 415 is a read-and-write memory device. However, unlike storage device 425, the system memory 415 is a volatile read-and-write memory, such as a random access memory. The system memory 415 stores some of the instructions and data that the processor needs at runtime. In some embodiments, the invention's processes are stored in the system memory 415, the permanent storage device 425, and/or the read-only 420. For example, the various memory units include instructions for processing signal communication between different sound-activated remote release electronic door stop devices, silent broadcast signal-activated electronic door stop devices, electronic door stop remote broadcast devices, and/or signal routers or signal repeaters deployed in the coverage area of the defined personal area network (PAN) and configured in accordance with one of the network architectures (i.e., peer-to-peer, mesh network, star network) and configured in accordance with IEEE 802.15.4/Zigbee-specified devices, including limited function end devices, fully-functional end devices, fully-functional signal router/repeater devices, and always at least one fully-functional coordinator device in each PAN. From these various memory units, the processing unit(s) 410 retrieves instructions to execute and data to process in order to execute the processes of some embodiments.

The bus 405 also connects to the input and output devices 430 and 435. The input devices enable the user to communicate information and select commands to the electronic system. The input devices 430 include push buttons to activate a silent broadcast signal over a defined personal area network (PAN), and may also include alphanumeric keyboards and pointing devices (also called "cursor control devices") used in connection with configuring, setting up, and deploying devices in the PAN. The output devices 435 may include transceivers that transmit silent signals to other devices and cause the electronic door stops to concurrently close in the event that a broadcast signal was triggered by a human operator depressing the push button on the EDS remote broadcast device described in this specification, and may also include textual log data generated by the electronic system 400 when a broadcast alert is triggered. The output devices 435 include transceivers, printers, display devices, audible devices, phones, etc. Some embodiments include telephony devices such as embedded and/or switch-operated phones that automatically call a list of emergency responder numbers when a broadcast alert is triggered by the EDS remote broadcast device and lockdown protocol is started in a school, office, or other such facility. Other output devices may include touchscreens of mobile smartphones or tablet computing devices used to configure devices or PAN settings, or used by new devices in joining existing PANs and configure the new device types (i.e., end device, router, repeater, and coordinator).

Finally, as shown in FIG. 4, bus 405 also couples electronic system 400 to a network 440 through a network adapter (not shown). In this manner, the computer can be a part of a network of computers (such as a local area network ("LAN"), a wide area network ("WAN"), or an intranet), or a network of networks (such as the Internet). Any or all components of electronic system 400 may be used in conjunction with the invention. While the descriptions above pertain to alternative networking specified under 802.15.4 or as a Zigbee network, some embodiments concurrently support the network adapter connection to LAN, WAN, etc. For instance, a voice-over-IP (VOIP) application can be triggered when the EDS remote broadcast device starts a school lockdown by causing all the doors in the school to automatically and simultaneously close when the push button on the EDS remote broadcast device is depressed. With such a VOIP application, a particular list of emergency responders can be automatically dialed and informed of the lockdown at the school and the potential emergency/intruder situation at hand, so that appropriate emergency response can be quickly engaged.

These functions described above can be implemented in digital electronic circuitry, in computer software, firmware, or hardware. The techniques can be implemented using one or more computer program products. Programmable processors and computers can be packaged or included in mobile devices, such as the unmounted battery-powered mobile EDS remote broadcast device described above by reference to FIGS. 26-29. The processes may be performed by one or more programmable processors and by one or more set of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

The above-described embodiments of the invention are presented for purposes of illustration and not of limitation. While these embodiments of the invention have been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

I claim:

1. A visual lockdown notification and alert device that provides visual notification of a lockdown in progress, the visual lockdown notification and alert device comprising:
 a printed circuit board (PCB) comprising internal PCB components;
 a programmable micro-processor that is disposed on the PCB and is programmable to define the visual lockdown notification and alert device as a particular type of device in a wireless personal area network (PAN);

an outer assembly cover that encloses the PCB and internal PCB components;

a plurality of micro-buttons to trigger notification and alert actions, wherein the plurality of micro-buttons comprise a first micro-button that is configured to trigger a retract notification to an electronic door stop, a second micro-button that is configured to trigger an extend notification to the electronic door stop, and a third micro-button that is configured to trigger an alert action to initiate an emergency broadcast signal to other devices defined in the wireless PAN;

a plurality of circuit relays that are disposed on the PCB and are configured to actuate notification and alert actions triggered by the plurality of micro-buttons; and an LED strobe globe light that flashes a visual notification and alert when a lockdown situation is in progress.

2. The visual lockdown notification and alert device of claim 1, wherein the visual lockdown notification and alert device provides an audibly silent visual lockdown notification and alert when the lockdown is in progress.

3. The visual lockdown notification and alert device of claim 2, wherein the lockdown is in progress due to an intruder.

4. The visual lockdown notification and alert device of claim 3, wherein the LED strobe globe light is triggered to flash the visual notification and alert by a human activating the third micro-button in the plurality of micro-buttons.

5. The visual lockdown notification and alert device of claim 3, wherein the LED strobe globe light is triggered to flash the visual notification and alert by a human activating an electronic door stop remote broadcast device.

6. The visual lockdown notification and alert device of claim 1, wherein the visual lockdown notification and alert device further comprises a microphone, wherein the outer assembly cover includes a microphone grill that is positioned to align over the microphone when the outer assembly cover encloses the PCB, wherein the LED strobe globe light is configured to provide a sound-activated visual lockdown notification and alert when the microphone captures an audible alarm that indicates a lockdown is in progress.

7. The visual lockdown notification and alert device of claim 6, wherein the lockdown is in progress due to a fire that triggered the audible alarm to sound.

8. The visual lockdown notification and alert device of claim 1, wherein the particular type of device in the wireless PAN comprises a fully-functional end device.

9. The visual lockdown notification and alert device of claim 1 further comprising a wireless RF transceiver that is disposed on the micro-processor and broadcasts wireless RF signals to a plurality of other visual lockdown notification and alert devices in the wireless PAN to trigger the audibly silent visual lockdown notification and alert in order to silently inform people that the lockdown is in progress.

10. The visual lockdown notification and alert device of claim 6 further comprising a wireless RF transceiver that is disposed on the micro-processor and is configured to inform other visual lockdown notification and alert devices that do not capture the audible alarm of the lockdown in progress, wherein the wireless RF transceiver broadcasts wireless RF signals over the wireless PAN to the other visual lockdown notification and alert devices that do not capture the audible alarm to trigger the sound-activated visual lockdown notification and alert in order to inform people that the lockdown is in progress.

11. The visual lockdown notification and alert device of claim 3, wherein the LED strobe globe light is triggered to flash the visual notification and alert by a human retracting the electronic door stop by activation of the first micro-button in the plurality of micro-buttons.

* * * * *